United States Patent
Ono et al.

(10) Patent No.: US 6,505,264 B1
(45) Date of Patent: Jan. 7, 2003

(54) INFORMATION TRANSMITTING APPARATUS AND METHOD, INFORMATION RECEIVING APPARATUS AND METHOD, AND INFORMATION TRANSMITTING/RECEIVING APPARATUS AND METHOD

(75) Inventors: Kinya Ono, Tsurugashima (JP); Makoto Matsumaru, Tsurugashima (JP); Sho Murakoshi, Tsurugashima (JP); Hidemi Usuba, Tsurugashima (JP); Kunihiro Minoshima, Tsurugashima (JP); Seiichi Hasebe, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/418,324

(22) Filed: Oct. 14, 1999

(30) Foreign Application Priority Data

Oct. 15, 1998 (JP) ............................ 10-294319

(51) Int. Cl.[7] ............................................. G06F 13/00
(52) U.S. Cl. .................. 710/107; 710/104; 710/22; 710/23; 710/24; 710/33; 370/409; 370/432; 370/440; 370/449; 370/462
(58) Field of Search ................................. 710/100, 104, 710/105, 107, 22, 23, 24, 33; 370/260, 409, 432, 440, 449, 462

(56) References Cited

U.S. PATENT DOCUMENTS 5,081,622 A * 1/1992 Nassehi et al. .......... 340/825.5
5,185,737 A * 2/1993 Nassehi et al. ............. 370/449
5,210,750 A * 5/1993 Nassehi et al. .......... 340/825.5
5,535,208 A * 7/1996 Kawakami et al. ......... 358/434
5,825,752 A * 10/1998 Fujimori et al. ......... 348/14.08
6,006,286 A * 12/1999 Baker et al. ................... 710/22

FOREIGN PATENT DOCUMENTS

| EP | 0 388 574 | 9/1990 |
| EP | 0 682 430 | 11/1995 |
| EP | 0 766 428 | 4/1997 |
| EP | 0 803 803 | 10/1997 |
| EP | 0 862 295 | 9/1998 |
| JP | 10-191283 | 7/1998 |

* cited by examiner

*Primary Examiner*—Rupal Dharia
(74) *Attorney, Agent, or Firm*—Nixon & Vanderhye P.C.

(57) ABSTRACT

An information transmitting apparatus is included in a system for transmitting information through a bus (B), for transmitting the information onto the bus. The information transmitting apparatus is provided with: an initialization detecting device (1) for detecting whether or not the bus is initialized; an obtaining device (6) for obtaining post-initialization information, which is the information transmitted on the bus immediately after an initialization of the bus when the initialization of the bus is detected by the initialization detecting device; and a transmission controlling device (3) for judging whether or not transmission information, which is the information to be transmitted onto the bus, can be transmitted in accordance with the obtained post-initialization information, and then transmitting the transmission information onto the bus if it is judged that the transmission information can be transmitted.

14 Claims, 15 Drawing Sheets

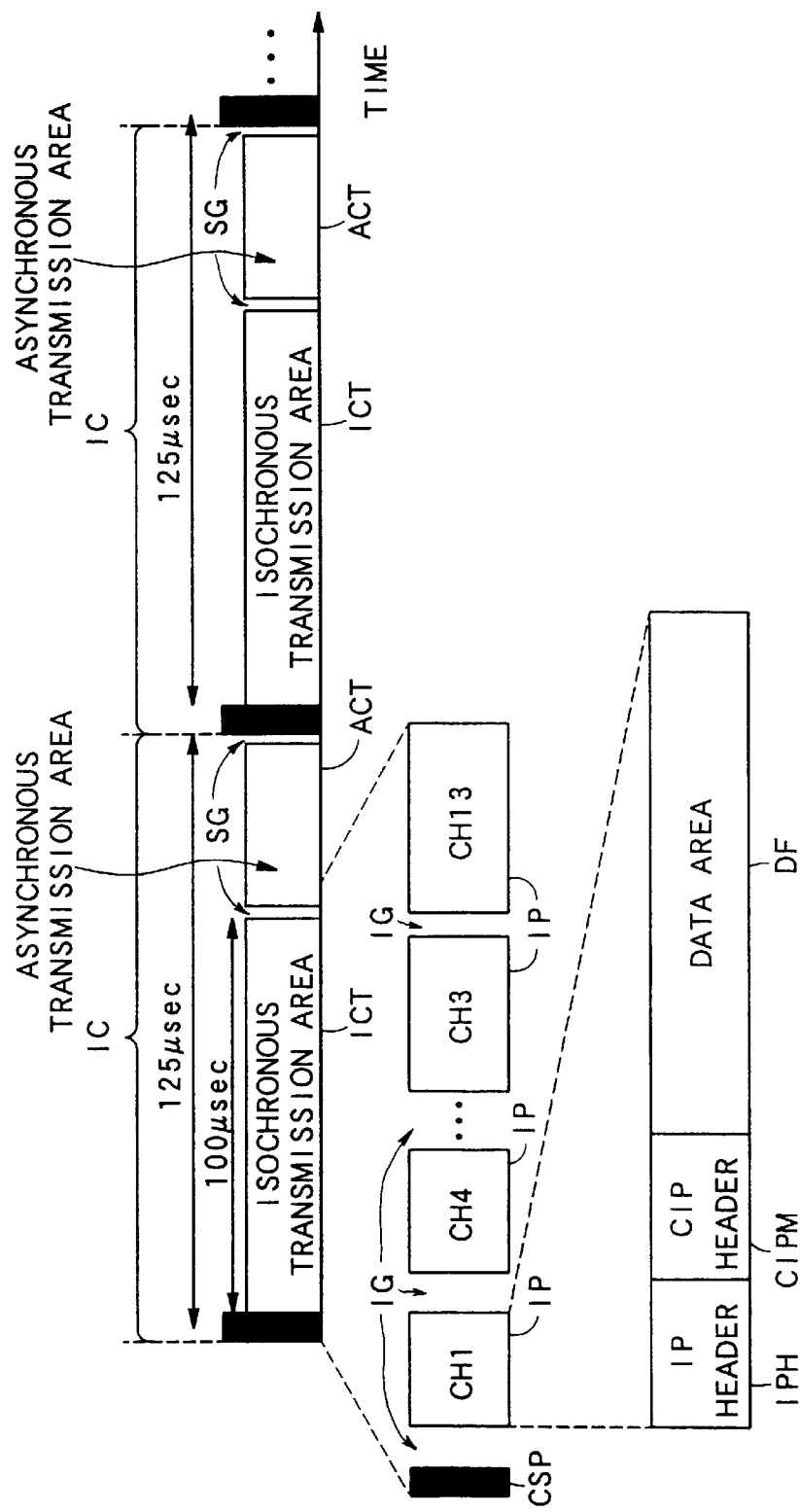

6d

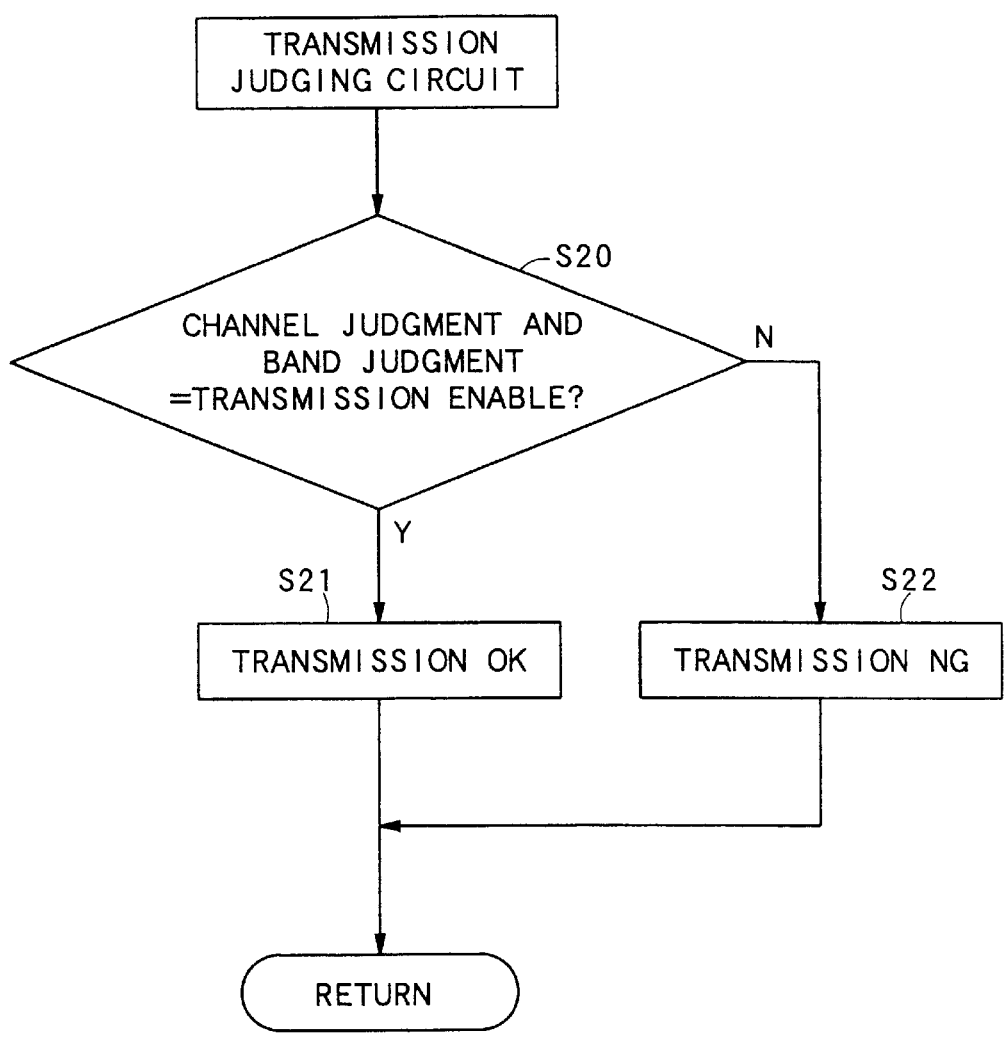

INFORMATION TRANSMITTING APPARATUS AND METHOD, INFORMATION RECEIVING APPARATUS AND METHOD, AND INFORMATION TRANSMITTING/RECEIVING APPARATUS AND METHOD

BACKGROUND OF THE INVENTION

1. Field of the Invention

The present invention relates to an information transmitting apparatus, an information receiving apparatus and an information transmitting/receiving apparatus, which are included in an information transmitting system, in which a serial bus is used to connect a plurality of apparatuses and information are transmitted between the apparatuses.

2. Description of the Related Art

Recently, a so-called IEEE 1394 standard (whose nominal name is "IEEE (Institute of Electrical and Electrical Engineers) Std.1394-1995 IEEE Standard for a High Performance Serial Bus") is published as a new standard to transmit information in real time through a serial bus between a plurality of information apparatuses (for example, a personal computer, a digital video camera, an MD (Mini Disk) and the like). A digital video cameral, a personal computer and the like having a serial port based on this standard are manufactured.

This IEEE 1394 standard is standardized such that a plurality of information apparatuses (hereafter, merely referred as "nodes") are connected through a serial bus to each other, and the information corresponding to a plurality of channels are transmitted in time sharing between these respective nodes (in this standard, it is standardized that the information can be transmitted by using a maximum of 63 different channels within a system connected through the serial bus).

In the IEEE 1394 standard, the initialization of a serial bus referred to as a so-called bus reset is standardized if another information apparatus is newly connected to a group of information apparatuses which are already connected through the serial bus to each other (namely, at a time of bus connection), or if one information apparatus is removed from the group of information apparatuses (namely, at a time of bus disconnection). Then, the following processes are carried out in conjunction with the bus reset, and a new connection manner is established (hereafter, this connection manner is referred to as a "topology").

(1) In conjunction with an occurrence of the bus reset, a node which has detected the occurrence of the bus reset (namely, a node to which an information apparatus is newly connected or a node from which a previous connection is separated) sends a bus reset signal indicative of the occurrence of the bus reset to all nodes connected to the serial bus.

(2) After the bus reset, a tree identification is carried out to connect each node onto a tree. Then, a node located at a vertex of the connected tree is recognized as a route node.

(3) Then, the recognized route node instructs each node to recognize an identification number (ID number) peculiar to each node to identify each node within a tree system.

(4) An IRM (Isochronous Resource Manager) node is set, which serves as a node for managing the communication statuses (actually, use channels of the respective nodes and later-described transmission occupation periods) of all the nodes within the generated tree and which is displayed by other nodes at an identifiable manner.

(5) Finally, a bus manager node is set, which serves as a node for controlling the information transmission statuses of all the nodes is established.

A new topology after the bus reset is established by the processes at the above-mentioned five stages.

If the information is actually transmitted after the establishment of the topology, a transmitting node serving as a node to start the transmission of the information inquires of the IRM node the current communication statuses at the other nodes. If a transmission occupation period and a channel which the transmitting node desires to use are available, the transmitting node obtains a right of transmitting the information and starts the transmission of the information.

Next, the transmission occupation period will be schematically described below.

In the IEE 1394 standard, the information from each node is collectively transmitted for each information unit referred to as an isochronous cycle. This isochronous cycle includes an isochronous transmission area which contains information to be transmitted synchronously with the information contained in the other isochronous cycles, and an asynchronous transmission area which contains information to be transmitted asynchronously with and independently of the other information. The information within the isochronous transmission area is time-shared for each channel, so that different information is transmitted for each channel.

At this time, in the isochronous transmission area, it is standardized that a length of the isochronous transmission area within one isochronous cycle has a maximum of 100 $\mu$sec. Thus, it is necessary that a total of periods occupied by the information assigned to the respective channels within one isochronous transmission area for the transmission is equal to or less than 100 $\mu$sec. At this time, the transmission time occupied by one channel within the isochronous cycle is the above-mentioned transmission occupation period. In addition, this transmission occupation period may be referred to as a use band of a serial bus, or may be referred to as a use capacity of a serial bus depending on a case. Also, when a length of the isochronous transmission area is less than 100 $\mu$sec (including a case of zero) within one isochronous cycle, an area within the isochronous cycle other than the isochronous transmission area is exclusively used as the asynchronous transmission area.

By the way, it is standardized that in the serial buses connected to each other, if the bus reset is induced by the disconnection or connection of the bus during the transmission of the information, the transmission occupation period and the channel can be successively each node by the after the bus reset, which have been used before the bus reset.

In this case, for example, as shown in FIG. 14A, while information is transmitted from a node 100 through a serial bus 103 to a node 101 by using a channel 1, if a node 102 is newly connected through a serial bus 104 to the node 101, although a new topology is established after the bus reset, the information transmission can be continued between the node 100 and the node 101 and between the node 101 and the node 102 without any problem, as the node 102 uses a different channel 2 to transmit the information to the node 101 for example.

However, for example, as shown in FIG.14B, while information is transmitted from a node 105 through a serial bus 109 to a node 106 by using the channel 1 and also while information is transmitted from a node 108 through a serial bus 110 to a node 107 by using the channel 1, if the node 106 and the node 108 are connected to each other through a serial bus 111 to thereby induce a bus reset, it is recognized on the standard that the transmission of the information is continued by using the same channel 1 as that before the bus reset, as for the node 105, as mentioned above. At the same time, it is also recognized on the standard that the transmission of the information is continued by using the same channel 1 as that before the bus reset, as for the node 108.

When this situation is considered from the standpoint of the node 107, the node 107 can receive both the information transmitted by the node 105 and the information transmitted by the node 108 on the topology. However, in this case, both are transmitted by using the same channel 1. Thus, the mixture of both the information is transmitted to the node 107.

Here, in the IEEE 1394 standard, the node of receiving information (the node 107, in the case of FIG. 14B) is allowed to only select a reception channel. Thus, in the case shown in FIG. 14B, the node 107 cannot judge whether it receives the information from the node 105 or receives the information from the node 108. This results in a problem that the node 107 cannot normally receive the information.

On the other hand, when a transmission occupation period of the information transmitted by the node 105 and a transmission occupation period of the information transmitted by the node 108 are considered in the case shown in FIG. 14B, they transmit the information independently of each other until the node 106 and the node 108 are connected to each other. Thus, the respective transmission occupation periods have no relation to each other.

However, in this case, the establishment of the connection between the node 106 and the node 108 causes the bus reset to be induced, which may cause a new topology to be established. Then, even after the bus reset, the node 105 and the node 108 try to transmit the information under the same channels and transmission occupation periods as those before the bus reset. Thus, there may be a case that the sum of the transmission occupation period of the information transmitted by the node 105 and the transmission occupation period of the information transmitted by the node 108 exceeds 100 $\mu$sec which is allowed on the standard, after the bus reset.

In this case, the transmission occupation period as the entire isochronous transmission area within the above-mentioned isochronous cycle exceeds 100 $\mu$sec. Thus, this case cannot meet the IEEE 1394 standard. This results in a problem that there may be a case in which the normal transmission of the information cannot be carried out.

SUMMARY OF THE INVENTION

The present invention is proposed in view of the above mentioned problems. It is therefore an object of the present invention to provide an information transmitting apparatus, an information transmitting method, an information receiving apparatus, an information receiving method, an information transmitting/receiving apparatus and an information transmitting/receiving method, in which even if a bus reset is induced in an entire new information transmitting system established by a connection of a plurality of information transmitting systems each independently transmitting information under the IEEE 1394 standard, the information can be normally transmitted between at least two nodes after the bus reset.

The above object of the present invention can be achieved by an information transmitting apparatus, which is included in a system for transmitting information through a bus such as a serial bus etc., for transmitting the information onto the bus. The information transmitting apparatus is provided with: an initialization detecting device such as a controller etc., for detecting whether or not the bus is initialized; an obtaining device such as a packet receiving unit etc., for obtaining post-initialization information, which is the information transmitted on the bus immediately after an initialization of the bus when the initialization of the bus is detected by the initialization detecting device; and a transmission controlling device such as a transmission judging circuit etc., for judging whether or not transmission information, which is the information to be transmitted onto the bus, can be transmitted in accordance with the obtained post-initialization information, and then transmitting the transmission information onto the bus if it is judged that the transmission information can be transmitted.

According to the information transmitting apparatus of the present invention, since it is judged whether or not the transmission information can be transmitted in accordance with the post-initialization information which is firstly transmitted on the bus after the initialization of the bus, it is possible to perform the transmission of the transmission information from at least one information transmitting apparatus when a plurality of different transmission informations are to be transmitted onto the bus from a plurality of information transmitting apparatuses each having the above described structure.

Therefore, it is possible to maintain the continuity of the information transmission from at least one information transmitting apparatus even after the bus is initialized.

In one aspect of the information transmitting apparatus of the present invention, the information transmitting apparatus is further provided with: a channel judging device such as a channel judging circuit etc., for judging whether or not a use channel, which is a channel used by the transmission information, is already used by the post-initialization information on the bus in accordance with the obtained post-initialization information; an occupied period detecting device such as an occupied period measuring circuit etc., for detecting a transmission occupied period, which is a period occupied while the post-initialization information is transmitted on the bus, in accordance with the obtained post-initialization information; and an occupied period judging device such as an occupied period judging circuit etc., for judging whether or not an occupied period sum, which is a sum of the detected transmission occupation period and the transmission occupation period corresponding to the transmission information, is shorter than a predetermined allowable period based on a performance of the bus. The transmission controlling device transmits the transmission information onto the bus, if the use channel is not used by the post-initialization information and further the occupation period sum is shorter than the predetermined allowable time, in accordance with a judgment result of the channel judging device and a judgment result of the occupied period judging device.

According to this aspect, since the transmission of the transmission information is performed when the use channel which is tried to be used by the transmission information is not already used and the occupation period sum including the transmission occupied period corresponding to the transmission information is shorter than the predetermined allowable time, it is possible to prevent a plurality of different transmission informations from being mixed on one channel, and can also prevent a transmission occupied period out of the standard from being generated.

In this aspect, the system may include a managing device such as an IRM node. etc, which manages the channel presently used within the system and the transmission occupied period presently occupied. The transmission controlling device may control the managing device to manage the transmission occupied period and the use channel corresponding to the transmission information if the use channel is not used by the post-initialization information and further the occupation period sum is shorter than the predetermined allowable time, in accordance with the judgment result of the channel judging device and the judgment result of the occupied period judging device.

By constructing in this manner, it is possible to make each apparatus, which is included in the system, speedily recognize the use channel used by the transmission information and the transmission occupied period occupied by the transmission information.

The above object of the present invention can be also achieved by an information receiving apparatus, which is included in a system for transmitting information through a bus such as a serial bus etc. for receiving the information transmitted by the above described information transmitting apparatus of the present invention. The information receiving apparatus is provided with: a second initialization detecting device such as a controller etc., for detecting whether or not the bus is initialized; a continuity detecting device such as a DBC (Data Block Counter) judging circuit etc., for receiving the post-initialization information when the bus is initialized according to a detection result of the second initialization detecting device, and detecting a presence or absence of a continuity between the information received before the initialization and the post-initialization information; and a demodulating device such as a packet selecting circuit etc., for determining that the received post-initialization information is the transmission information only if there is the continuity according to a detection result of the continuity detecting device, and then demodulating the received post-initialization information.

According to the information receiving apparatus of the present invention, when receiving the transmission information transmitted by the information transmitting apparatus of the present invention, since it is judged whether the receiving and decoding operations are to be carried out or not by detecting the presence or absence of the continuity of the information before and after the bus initialization, it is possible to successively receive and decode the information, which has been received until that time, even if the bus is initialized.

Therefore, it is possible to continue the information transmission between the information transmitting apparatus and the information receiving apparatus of the present invention even after the bus initialization.

In one aspect of the information receiving apparatus of the present invention, the continuity detecting device detects order information, which is included in an information unit in the post-initialization information and indicates an order of the information unit in the post-initialization information, and detects the continuity if there is a continuity between the order information in the information received before the initialization and the order information in the post-initialization information.

According to this aspect, since the continuity of the information before and after the bus initialization is detected by use of the continuity of the order information included in the information unit of the post-initialization information, it is possible to certainly receive the information continued before and after the bus initialization.

The above object of the present invention can be also achieved by an information transmitting/receiving apparatus, which is included in a system for transmitting information through a bus, provided with the above described information transmitting apparatus of the present invention, and an information receiving apparatus for receiving the information transmitted onto the bus by the information transmitting apparatus. The information receiving apparatus is provided with: a continuity detecting device for receiving the post-initialization information when the bus is initialized according to a detection result of the second initialization detecting device, and detecting a presence or absence of a continuity between the information received before the initialization and the post-initialization information; and a demodulating device for determining that the received post-initialization information is the transmission information only if there is the continuity according to a detection result of the continuity detecting device, and then demodulating the received post-initialization information.

According to the information transmitting/receiving apparatus of the present invention, since it is provided with the above described information transmitting apparatus of the present invention, it is possible to perform the transmission of the transmission information from at least one information transmitting apparatus when a plurality of different transmission informations are to be transmitted onto the bus from a plurality of information transmitting apparatuses each having the above described structure. Further, since, when receiving the transmission information transmitted by the information transmitting apparatus of the present invention, it is judged whether the receiving and decoding operations are to be carried out or not by detecting the presence or absence of the continuity of the information before and after the bus initialization, it is possible to successively receive and decode the information, which has been received until that time, even if the bus is initialized.

In one aspect of the information transmitting/receiving apparatus of the present invention, the information transmitting apparatus is further provided with: a channel judging device for judging whether or not a use channel, which is a channel used by the transmission information, is already used by the post-initialization information on the bus in accordance with the obtained post-initialization information; an occupied period detecting device for detecting a transmission occupied period, which is a period occupied while the post-initialization information is transmitted on the bus, in accordance with the obtained post-initialization information; and an occupied period judging device for judging whether or not an occupied period sum, which is a sum of the detected transmission occupation period and the transmission occupation period corresponding to the transmission information, is shorter than a predetermined allowable period based on a performance of the bus. The transmission controlling device transmits the transmission information onto the bus, if the use channel is not used by the post-initialization information and further the occupation period sum is shorter than the predetermined allowable time, in accordance with a judgment result of the channel judging device and a judgment result of the occupied period judging device.

According to this aspect, since the transmission of the transmission information is performed when the use channel which is tried to be used by the transmission information is not already used and the occupation period sum including the transmission occupied period corresponding to the transmission information is shorter than the predetermined allowable time, it is possible to prevent a plurality of different transmission informations from being mixed on one channel, and can also prevent a transmission occupied period out of the standard from being generated.

The above object of the present invention can be also achieved by an information transmitting method, in a system for transmitting information through a bus, of transmitting the information onto the bus. The information transmitting method includes: an initialization detecting process of detecting whether or not the bus is initialized; an obtaining process of obtaining post-initialization information, which is the information transmitted on the bus immediately after an initialization of the bus when the initialization of the bus is detected by the initialization detecting process; and a transmission controlling process of judging whether or not transmission information, which is the information to be transmitted onto the bus, can be transmitted in accordance with the obtained post-initialization information, and then transmitting the transmission information onto the bus if it is judged that the transmission information can be transmitted.

According to the information transmitting method of the present invention, in the same manner as the above described information transmitting apparatus of the present invention, it is possible to perform the transmission of the transmission information from at least one information transmitting apparatus when a plurality of different transmission informations are to be transmitted onto the bus from a plurality of information transmitting apparatuses each having the above described structure.

In one aspect of the information transmitting method of the present invention, the information transmitting method further includes: a channel judging process of judging whether or not a use channel, which is a channel used by the transmission information, is already used by the post-initialization information on the bus in accordance with the obtained post-initialization information; an occupied period detecting process of detecting a transmission occupied period, which is a period occupied while the post-initialization information is transmitted on the bus, in accordance with the obtained post-initialization information; and an occupied period judging process of judging whether or not an occupied period sum, which is a sum of the detected transmission occupation period and the transmission occupation period corresponding to the transmission information, is shorter than a predetermined allowable period based on a performance of the bus. The transmission controlling process transmits the transmission information onto the bus, if the use channel is not used by the post-initialization information and further the occupation period sum is shorter than the predetermined allowable time, in accordance with a judgment result of the channel judging process and a judgment result of the occupied period judging process.

According to this aspect, in the same manner as the above described one aspect of the information transmitting apparatus of the present invention, it is possible to prevent a plurality of different transmission informations from being mixed on one channel, and can also prevent a transmission occupied period out of the standard from being generated.

In this aspect, the system may include a managing device such as an IRM node. etc, which manages the channel presently used within the system and the transmission occupied period presently occupied. The information transmitting method may control the managing device to manage the transmission occupied period and the use channel corresponding to the transmission information if the use channel is not used by the post-initialization information and further the occupation period sum is shorter than the predetermined allowable time, in accordance with the judgment result of the channel judging process and the judgment result of the occupied period judging process.

By constructing in this manner, it is possible to make each apparatus, which is included in the system, speedily recognize the use channel used by the transmission information and the transmission occupied period occupied by the transmission information.

The above object of the present invention can be also achieved by an information receiving method, in a system for transmitting information through a bus, of receiving the information transmitted by the above described information transmitting method of the present invention. The information receiving method includes: a second initialization detecting process of detecting whether or not the bus is initialized; a continuity detecting process of receiving the post-initialization information when the bus is initialized according to a detection result of the second initialization detecting process, and detecting a presence or absence of a continuity between the information received before the initialization and the post-initialization information; and a demodulating process of determining that the received post-initialization information is the transmission information only if there is the continuity according to a detection result of the continuity detecting process, and then demodulating the received post-initialization information.

According to the information receiving method of the present invention, in the same manner as the above described information receiving apparatus of the present invention, it is possible to successively receive and decode the information, which has been received until that time, even if the bus is initialized.

In one aspect of the information receiving method of the present invention, the continuity detecting process detects order information, which is included in an information unit in the post-initialization information and indicates an order of the information unit in the post-initialization information, and detects the continuity if there is a continuity between the order information in the information received before the initialization and the order information in the post-initialization information.

According to this aspect, in the same manner as the above described one aspect of the information receiving apparatus of the present invention, it is possible to certainly receive the information continued before and after the bus initialization.

The above object of the present invention can be also achieved by an information transmitting/receiving method, in a system for transmitting information through a bus, including the above described information transmitting method of the present invention and an information receiving method of receiving the information transmitted onto the bus by the information transmitting method. The information receiving method includes: a continuity detecting. process of receiving the post-initialization information when the bus is initialized according to a detection result of the second initialization detecting process, and detecting a presence or absence of a continuity between the information received before the initialization and the post-initialization information; and a demodulating process of determining that the received post-initialization information is the transmission information only if there is the continuity according to a detection result of the continuity detecting process, and then demodulating the received post-initialization information.

According to the information transmitting/receiving method of the present invention, in the same manner as the above described information transmitting/receiving apparatus of the present invention, it is possible to perform the transmission of the transmission information from at least one information transmitting apparatus when a plurality of different transmission informations are to be transmitted onto the bus from a plurality of information transmitting apparatuses each having the above described structure. Further, it is possible to successively receive and decode the information, which has been received until that time, even if the bus is initialized.

In one aspect of the information transmitting/receiving method of the present invention, the information transmitting method further includes: a channel judging process of judging whether or not a use channel, which is a channel used by the transmission information, is already used by the post-initialization information on the bus in accordance with the obtained post-initialization information; an occupied period detecting process of detecting a transmission occupied period, which is a period occupied while the post-initialization information is transmitted on the bus, in accordance with the obtained post-initialization information; and an occupied period judging process of judging whether or not an occupied period sum, which is a sum of the detected transmission occupation period and the transmission occupation period corresponding to the transmission information, is shorter than a predetermined allowable period based on a performance of the bus. The transmission controlling process transmits the transmission information onto the bus, if the use channel is not used by the post-initialization information and further the occupation period sum is shorter than the predetermined allowable time, in accordance with a judgment result of the channel judging process and a judgment result of the occupied period judging process.

According to this aspect, in the same manner as the above described one aspect of the information transmitting/receiving apparatus of the present invention, it is possible to prevent a plurality of different transmission informations from being mixed on one channel, and can also prevent a transmission occupied period out of the standard from being generated.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3 is a diagram showing a configuration of an isochronous cycle;

FIG. 12 is a flowchart showing processes in a transmission judging circuit at a time of a data transmission after the bus reset in the embodiment;

DETAILED DESCRIPTION OF THE PREFERRED EMBODIMENTS

Preferred embodiments of the present invention will be explained below with reference to the drawings.

(I) Outline of IEEE 1394 Standard

At first, the information transmission through the serial bus in accordance with the above-mentioned IEEE 1394 standard (hereafter, merely referred to as the serial bus standard) according to the present invention will be typically described with reference to FIGS. 1A to 6, before explaining the embodiments.

Figure 1A:
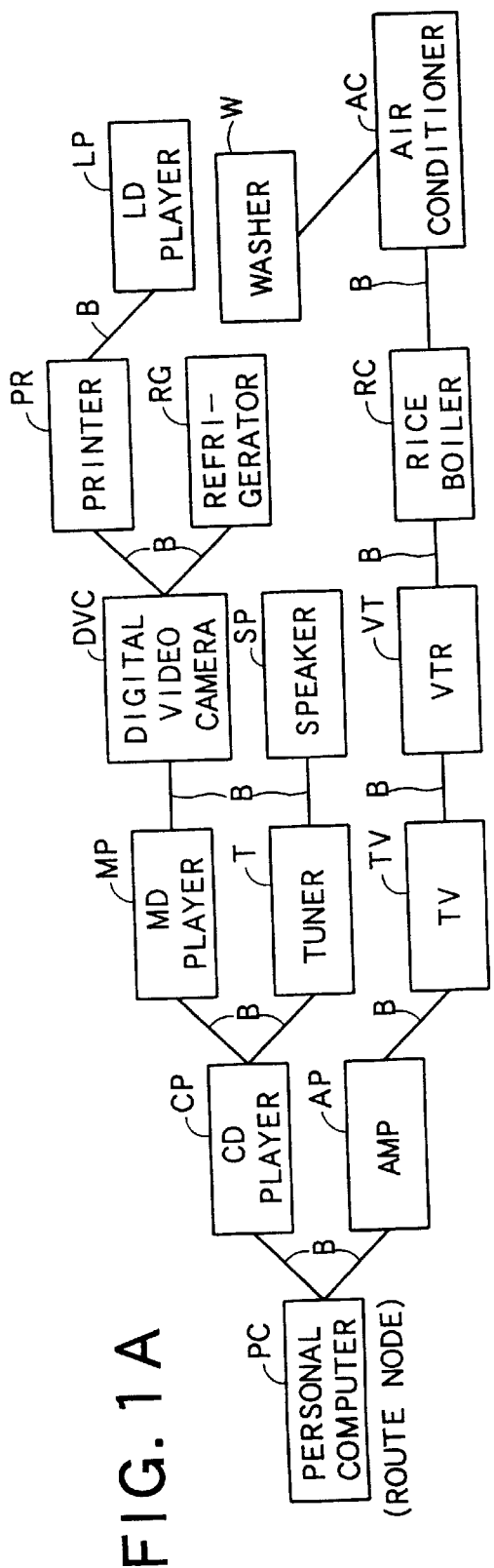
FIG. 1A is a diagram showing an example of serially-connected electrical apparatuses, in electrical products (nodes) connected in accordance with an IEEE 1394 standard.
Figure 1B:
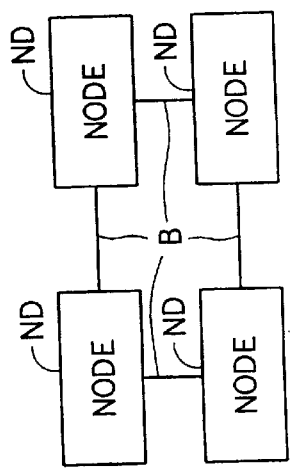
FIG. 1B is a diagram showing a loop connection in the electrical products (nodes)
Figure 2A:
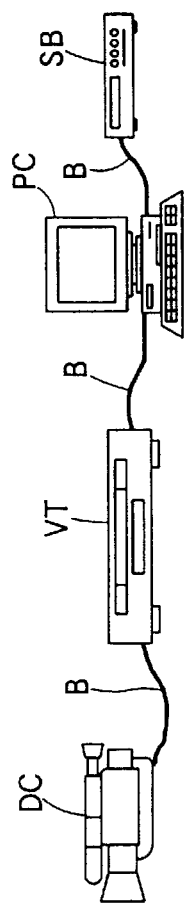
FIG. 2A is a diagram exemplifying a transmission manner on a serial bus.
Figure 2B:
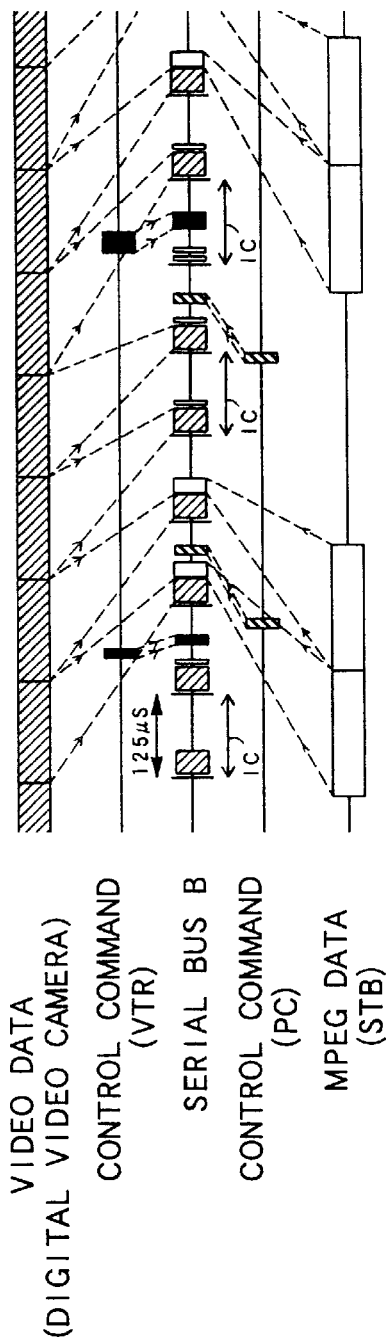
FIG. 2B is a timing chart showing various data and commands in the transmission on the serial bus of FIG. 2A.
Figure 4:
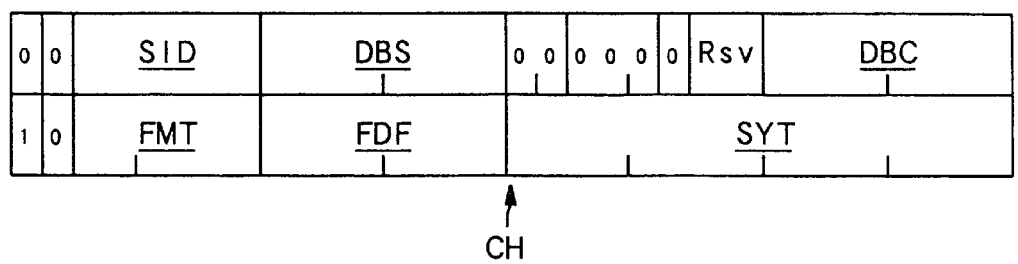
FIG. 4 is a diagram showing a configuration of a CIP header.
Figure 5:
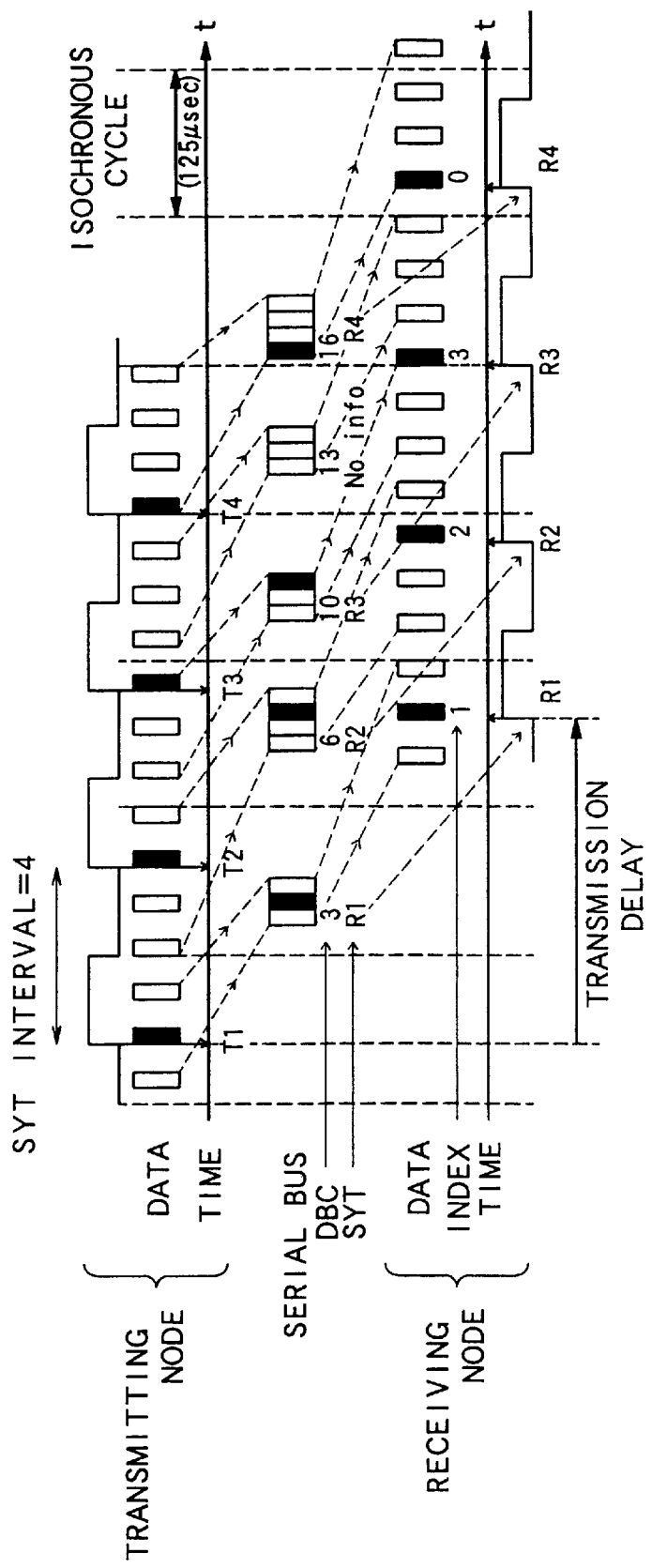
FIG. 5 is a diagram showing an actual transmission manner.
Figure 6:
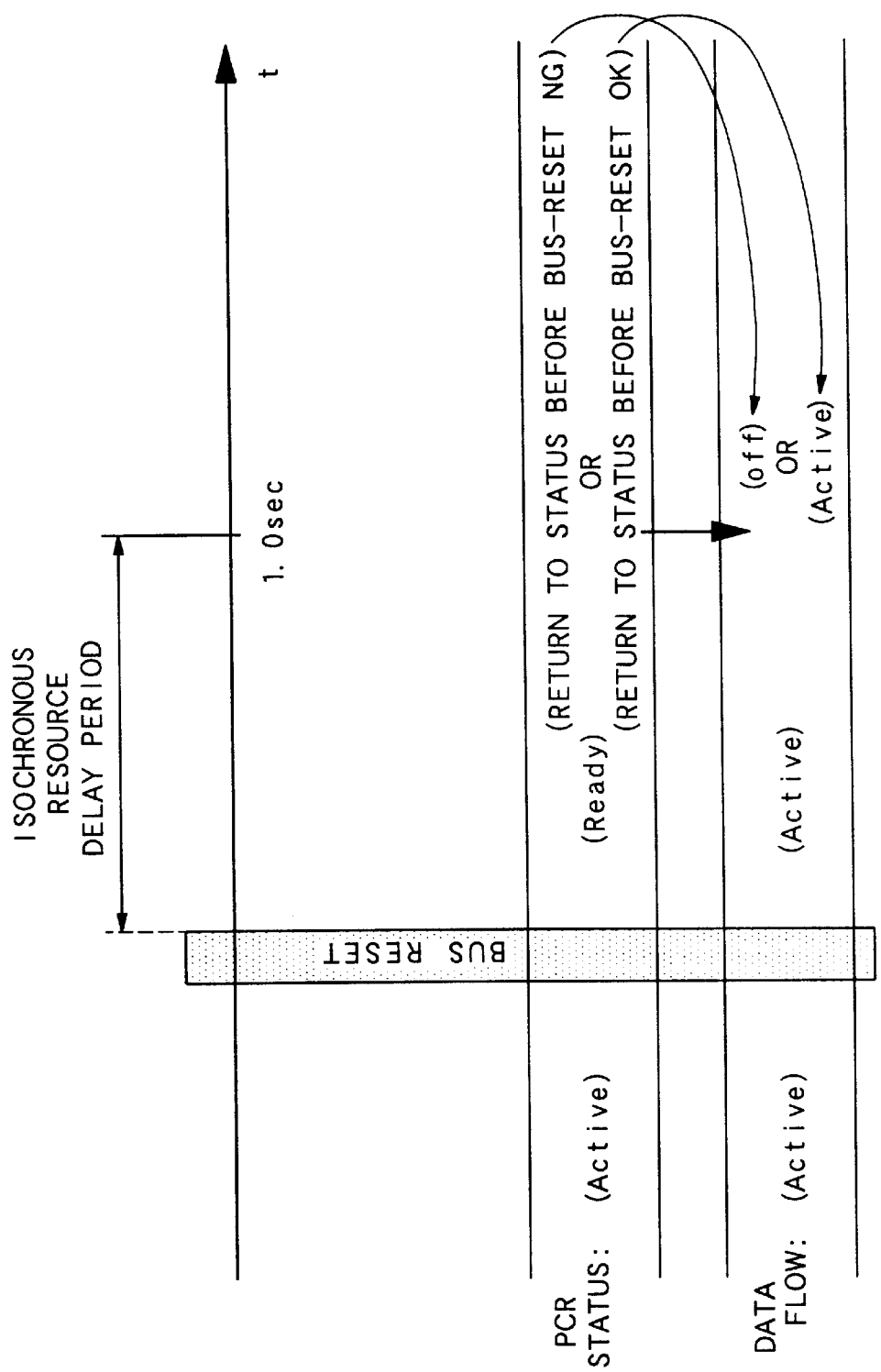
FIG. 6 is a diagram explaining an information transmission before and after a bus reset.

FIGS. 1A and 1B are diagrams exemplifying a manner of a topology in the serial bus standard. FIGS. 2A and 2B are diagrams exemplifying a transmission manner on the serial bus. FIG. 3 is a diagram showing a configuration of the isochronous cycle. FIG. 4 is a diagram showing a configuration of a CIP (Common Isochronous Packet) header. FIG. 5 is a diagram showing an actual transmission manner. FIG. 6 is a diagram explaining an information transmission after a bus reset.

The serial bus standard is the standard for the serial bus through which various electrical apparatuses that are presently used or are considered to be used in future are all connected in series and under which information is mutually sent and received between them.

Actually, all settings when respective nodes are connected are automatically carried out. Moreover, a new node can be connected without an interruption of a power supply.

On the other hand, as for the manner of the information transmission, a high speed transmission can be carried out in a range between 100 Mbps and 3.2 Gbps. Moreover, various information can be transmitted by using a real time transmission, a two-way transmission and a multi-channel transmission.

As for the manner of connecting the respective nodes, as shown in FIG. 1A, for example, with a personal computer PC as a route node (as mentioned above, a node at a vertex in a topology in a form of tree), various electrical products, such as a CD (Compact Disc) player CP, an MD (Mini Disc) player MP, a digital video camera DVC, a printer PR, an LD (LASER Disc) player LP, a refrigerator RG, a tuner T, a speaker SP, an amplifier AP, a television apparatus TV, a video tape recorder VT, a rice boiler RC, an air conditioner AC, a washer W and so on, are connected through a serial bus B. Then, they can be managed and controlled by the personal computer PC.

The number of electrical products (corresponding to the above-mentioned nodes) that can be contained in one system (i.e., a system connected in the form of tree through the serial bus) is 63 at its maximum, in the serial bus standard. Moreover, one system can contain the number of connections between two nodes up to a maximum of 16. In addition, it is prohibited on the standard that a plurality of nodes ND in the one system are connected in a form of loop, as shown in FIG. 1B.

The actual transmission manner will be concretely described below.

At first, as shown in FIG. 2A, it is supposed that the digital video camera DVC, the video tape recorder VT, the personal computer PC and a set top box SB for receiving a broadcast are connected through the serial bus B to each other with the respective apparatuses as the nodes and that information are transmitted. Actually, it is assumed that a video data is sent by the digital video camera DVC to the serial bus B, a predetermined control command is sent by the video tape recorder VT to the serial bus B, a control command for controlling another apparatus is similarly sent by the personal computer PC to the serial bus B, and a picture data (an MPEG data compressed in accordance with an MPEG (Moving Picture Expert Group) standard) included in a received broadcast wave is sent by the set top box SB to the serial bus B, respectively.

In this case, as the manner of transmitting the various information sent on the serial bus B, as shown in FIG. 2B, the information from each node is transmitted while each occupies the serial bus B in a time sharing way. Then, each information is inserted into an isochronous cycle IC that is a synchronous unit on the serial bus B having a length of 125 $\mu$sec, and it is transmitted.

A data configuration within the isochronous cycle IC will be described below with reference to FIGS. 3 and 4.

As shown in FIG. 3, the isochronous cycle IC is provided with: a cycle start packet CSP which is always inserted in a lead of the isochronous cycle IC in order to match standard times of all the nodes with each other; an isochronous transmission area ICT which is composed of by isochronous packets IP corresponding to a plurality of channels and further constituted such that information synchronous with each other are included in the respective isochronous packets IP; and an asynchronous transmission area ACT in which asynchronous information is included (for example, various control information, correspondence information corresponding to the various control information and the like).

A sub-action gap SG serving as a time gap indicative of an end of one isochronous transmission area ICT or an end of one asynchronous transmission area ACT is inserted in a final tail of each isochronous transmission area ICT and a final tail of the asynchronous transmission area ACT. Moreover, an isochronous gap IG serving as a time gap indicating an end of each packet is inserted between the respective isochronous packets IP and between the cycle start packet CSP and the isochronous packet IP at the lead. At this time, a length of the sub-action gap SG is set to be longer than that of the isochronous gap IG.

One isochronous packet IP is composed of an IP (Isochronous Packet) header IPH including information indicative of a data amount in each isochronous packet IP and information indicative of a channel of transmitting information in each isochronous packet IP, a later-described CIP header CIPH and a data area DF including actual video information or audio information. Here, for example, in a case of the audio information, a plurality of data blocks are included in the data area DF, with a data corresponding to one sample as one data block.

On the other hand, as shown in FIG. 4, the CIP header CIPH is at least composed of: a node identifier (Source ID) SID for identifying a node which sends an isochronous packet IP including the CIP header CIPH; a data block number DBS for indicating the number of data blocks included in the data area DF; an order information (Data Block Counter) DBC which is continuously given to a data in a plurality of data areas DF transmitted from one node in the transmitted order; a data identifier (Format ID) FMT indicative of a type of a data included in the data area DF; a relation information (Format Dependent Field) FDF which is the data in relation to the type of the data indicated by the data identifier FMT (for example, if the data identifier FMT indicates an audio data, a sampling frequency thereof); and a process time information SYT which implies a time when a corresponding process is started after a data included in the data area DF is received by a node receiving the data.

The actual manner of transmitting each data will be described below with reference to FIG. 5.

FIG. 5 describes a case of a transmission manner referred to as a so-called non-blocking transmission among the transmission manners standardized in the serial bus standard.

In FIG. 5, an SYT interval implies an interval at which the process time information SYT is added to a transmission data to be transmitted in a transmitting node (a transmission data to be included in the data area DF).

As shown in FIG. 5, when a transmission data to be transmitted in a certain transmitting node is generated, the process time information SYT is firstly given to a transmission data for each predetermined interval (an interval between a time T2 and a time T1, in FIG. 5), among the generated transmission data.

Then, the generated transmission data is sent out onto the serial bus B (refer to FIG. 2B). At this time, an order information DBC and a process time information SYT having continuous numbers as exemplified in FIG. 5 are added to the CIP header CIPH.

Next, when the receiving node receives the isochronous cycle IC in this status, the receiving node disassembles the isochronous cycle IC and takes out the transmission data, and further starts a process corresponding to each received transmission data at a time (indicated by "R1", "R2" or the like in FIG. 5) described in the process time information SYT.

In this case, a difference between a time (for example, the time T1) when the process time information SYT is given to the transmission data to which each index is added in the transmitting node and a time (the time R1, in this case) described in the corresponding process time information SYT corresponds to a transmission delay on the serial bus B.

Next, a process in each node in a case of an occurrence of a bus reset will be typically described below with reference to FIG. 6.

FIG. 6 shows a status of one node before and after the bus reset and a transmission status of a data with regard to the node. A PCR (Plug Control Register) status in FIG. 6 is a status of a register mounted for each node, and it shows a status of a register in which a status of an information transmission of the node is described (actually, a presently-used channel and a transmission occupation period).

At first, before the bus reset, the PCR status represents a status of an information transmission in a node at that time, and data is normally transmitted (in FIG. 6, before the bus reset, a data flow and the PCR status are both set to be "Active").

If the bus reset occurs and then a node detecting this occurrence transmits a bus reset signal to all the other nodes, the above-mentioned processes (1) to (5) are executed so that the IRM node as a managing unit and the like are established.

Next, a node which transmits data before the bus reset continues to transmit the data by using the same transmission occupation period and the same use channel as those before the bus reset, for one second after the IRM node is established and an identification number of each node is given (this one second is referred to as an isochronous resource delay period) (in FIG. 6, the data flow is "Active"). Then, the transmitting node, while keeping the PCR status at a waiting status during this period (in FIG. 6, the PCR status is "Ready"), simultaneously inquires of the IRM node if the transmission occupation period and the use channel before the bus reset can be used in successively.

If the use channel before the bus reset is not still used upon the inquiry of the IRM node and further the transmission occupation period can be reserved, the transmitting node continues to transmit the data by using the information transmission status before the bus reset as it is, after an elapse of one second after the bus reset (in FIG. 6, a case that the data flow becomes "Active" after the elapse of one second after the bus reset). On the other hand, if the use channel before the bus reset is already used or if the transmission occupation period cannot be reserved, the transmitting node stops the data transmission after the elapse of one second after the bus reset (in FIG. 6, this corresponds to a case that the data flow becomes "off" after the elapse of one second after the bus reset).

As mentioned above, after the elapse of one second after the bus reset, the node, which can reserve the use channel before the bus reset and can reserve the transmission occupation period before the bus reset, normally resumes the transmission of information. A node other than that node transiently stops a transmission of information, and then inquires of the IRM node a transmission occupation period and a channel, which are described and presently used, for each constant time, and again starts the transmission of information if a channel desired by the node is empty and further a transmission occupation period can be reserved.

(II) Embodiments

Embodiments of the present invention carried out in accordance with the above-mentioned serial bus standard will be described below with reference to FIGS. 7 to 13.

Figure 7:
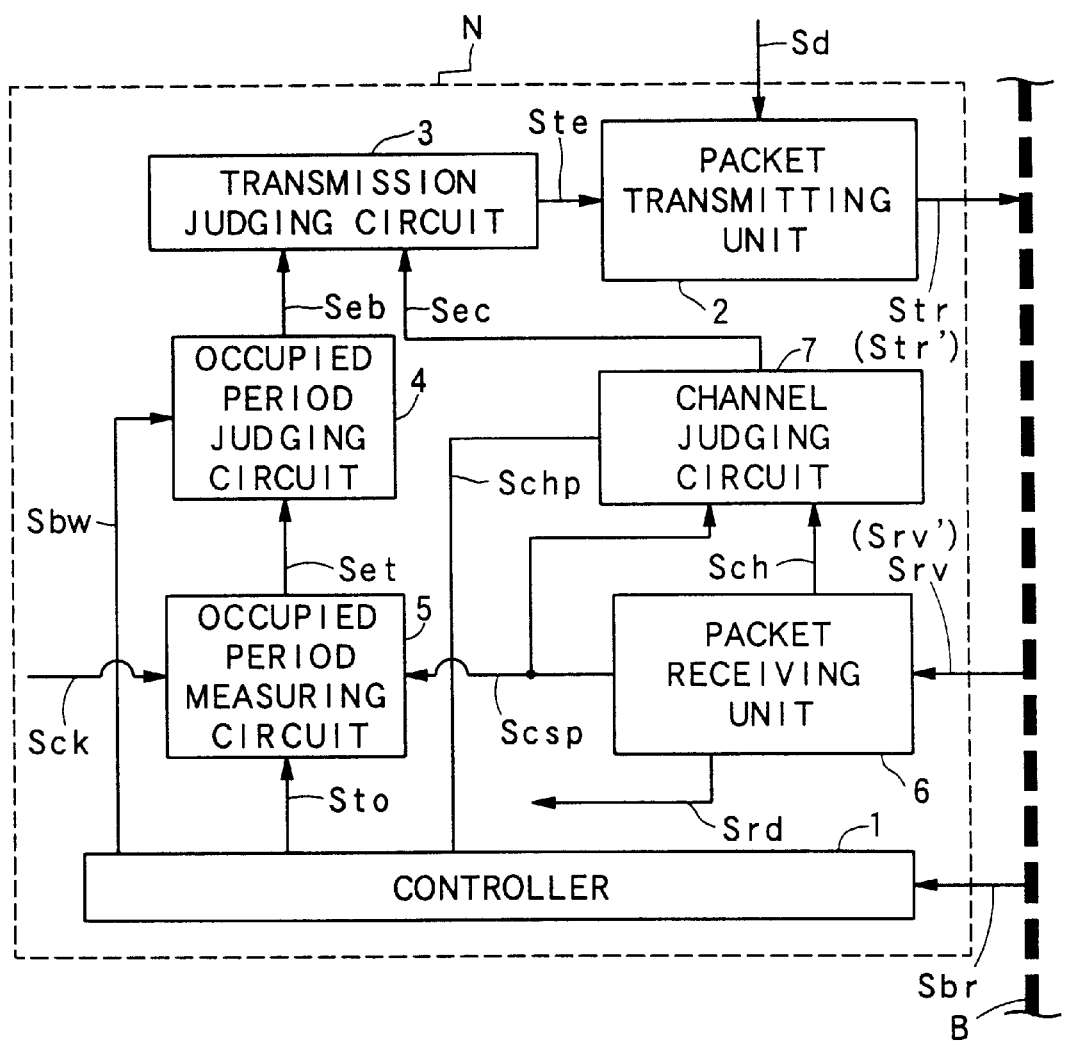
FIG. 7 is a block diagram showing a schematic configuration of a node in an embodiment.
Figure 8:
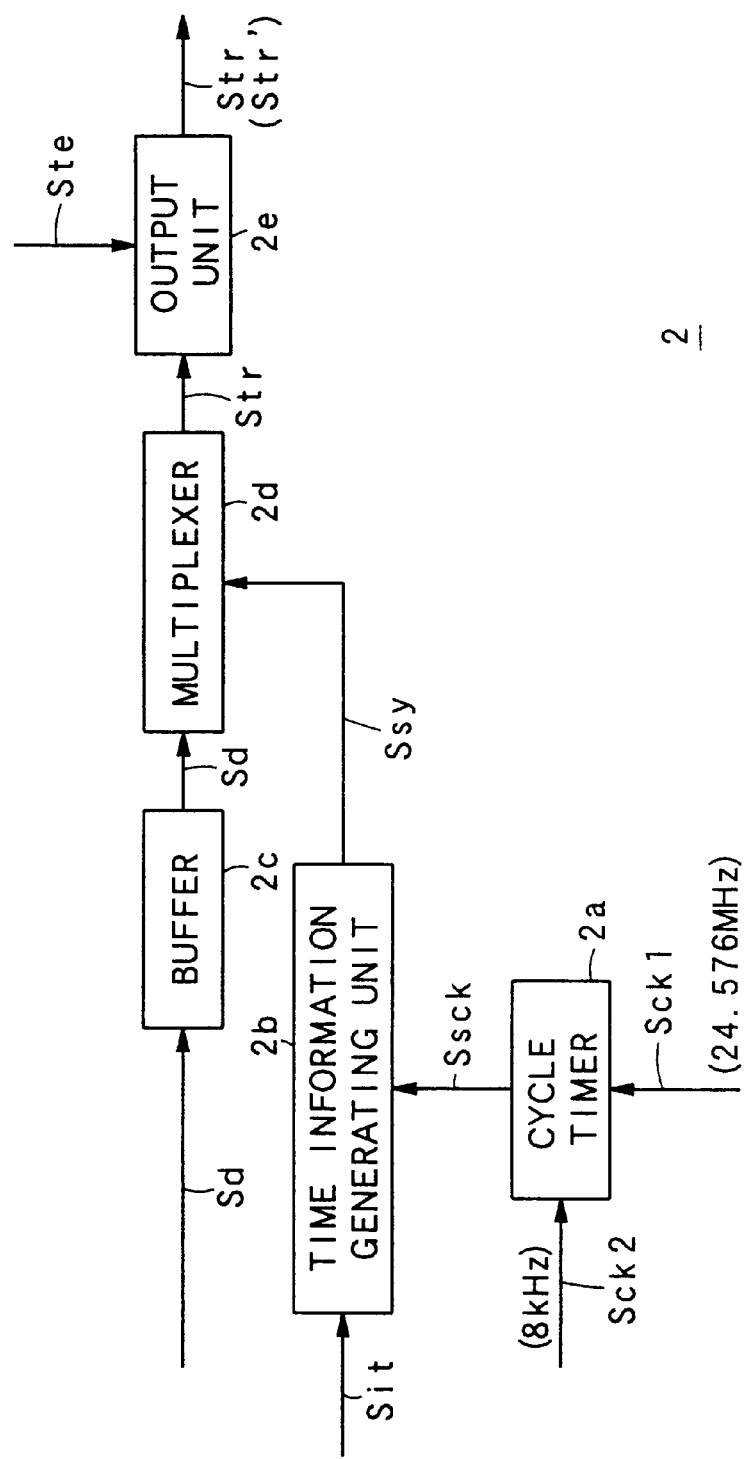
FIG. 8 is a block diagram showing a detailed configuration of a packet transmitting unit in the embodiment.
Figure 9:
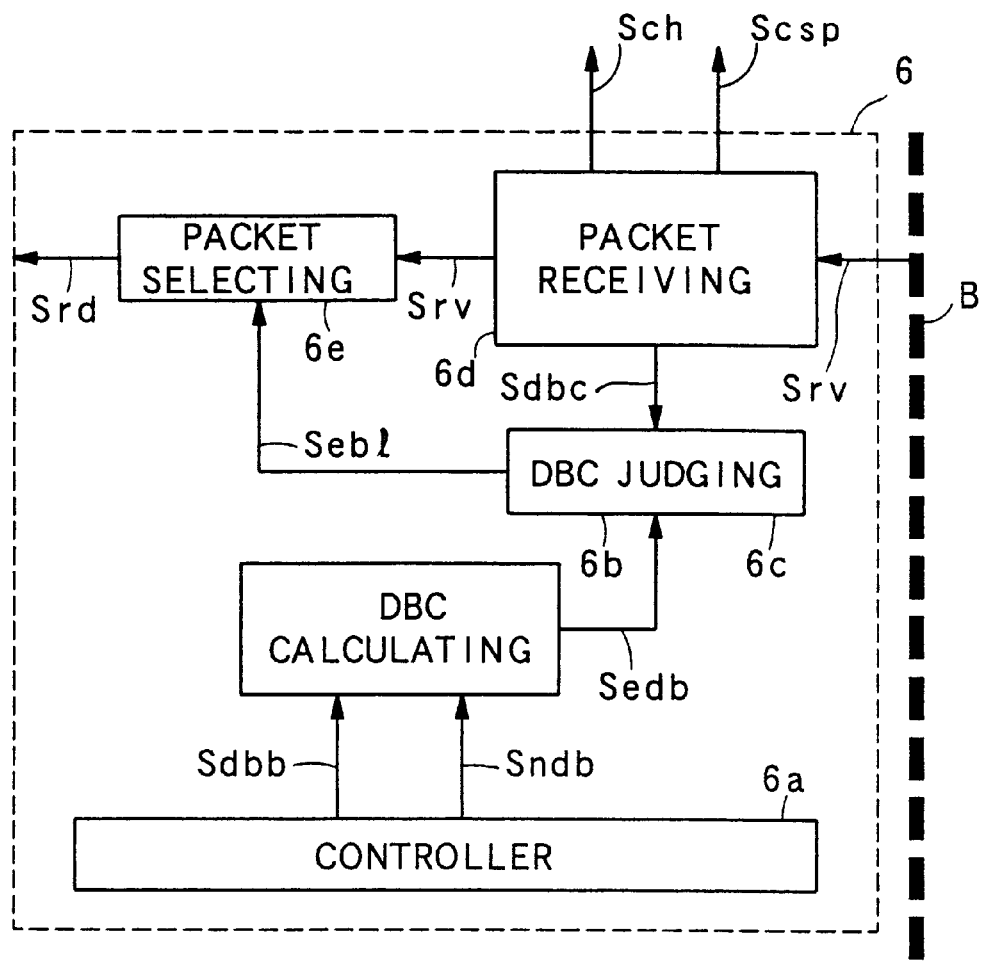
FIG. 9 is a block diagram showing a detailed configuration of a packet receiving unit in the embodiment.
Figure 10:
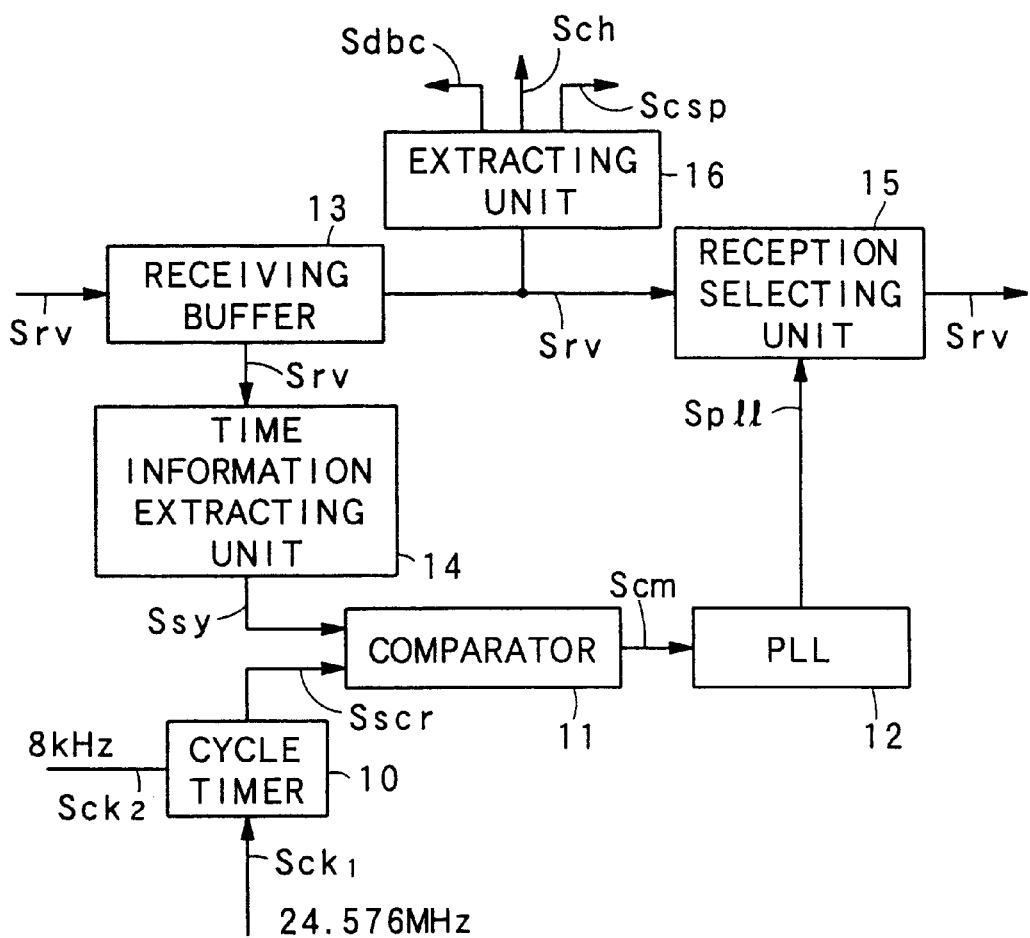
FIG. 10 is a block diagram showing a detailed configuration of a packet receiving circuit in the embodiment.
Figure 11A:
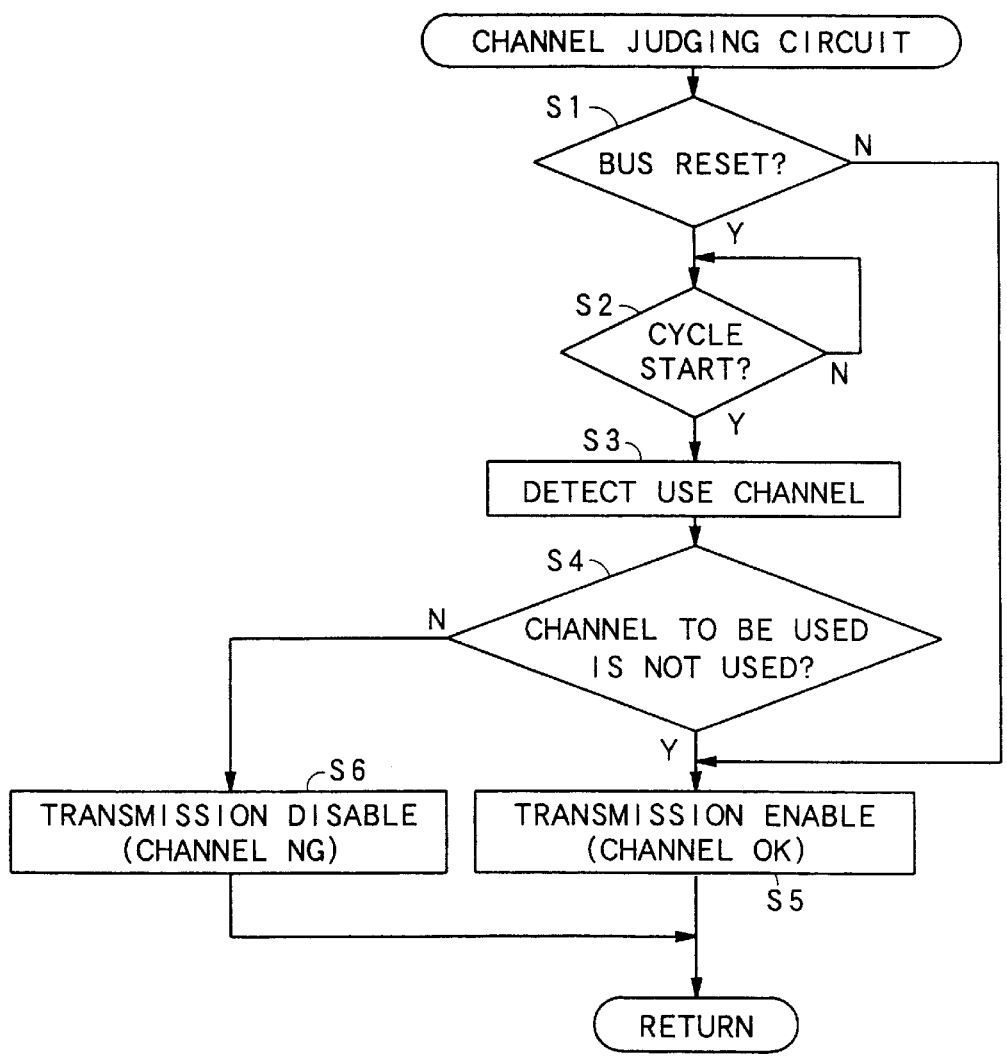
FIG. 11A is a flowchart showing processes in a channel judging circuit, in processes at a time of a data transmission after the bus reset in the embodiment.
Figure 11B:
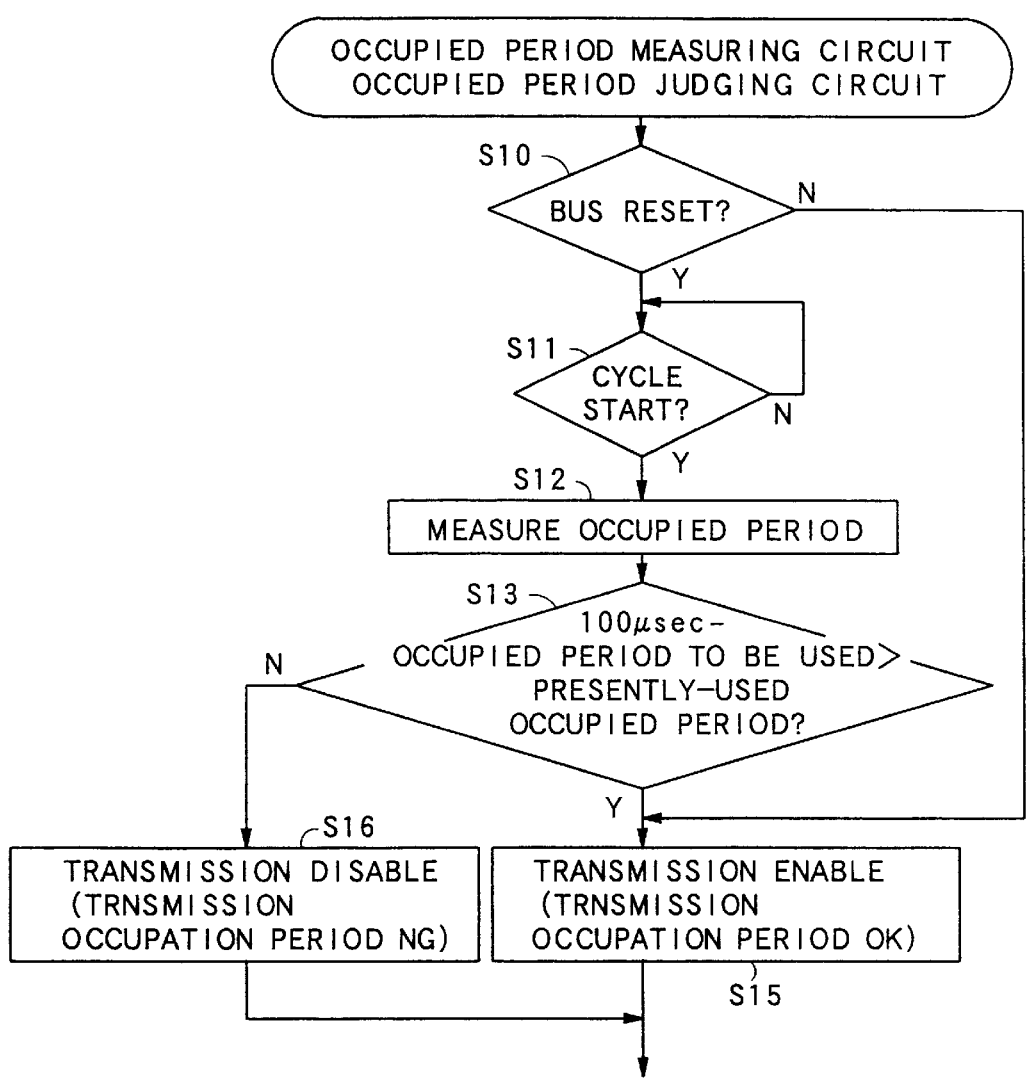
FIG. 11B is a flowchart showing processes in an occupied period measuring circuit and an occupied period judging circuit, in the processes at the time of the data transmission after the bus reset in the embodiment.
Figure 13:
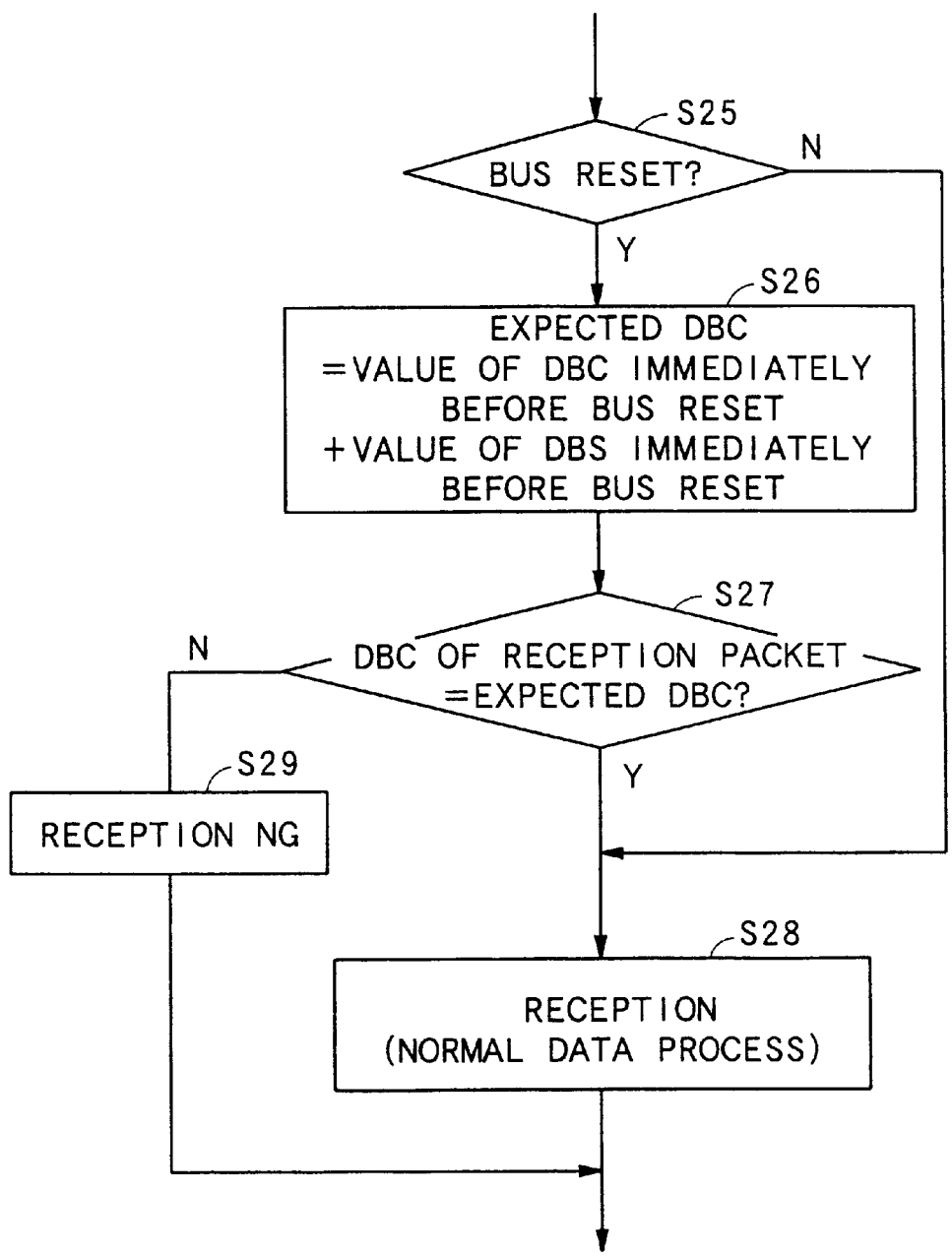
FIG. 13 is a flowchart showing processes in the packet receiving unit at a time of a data reception after the bus reset in the embodiment.
Figure 14A:
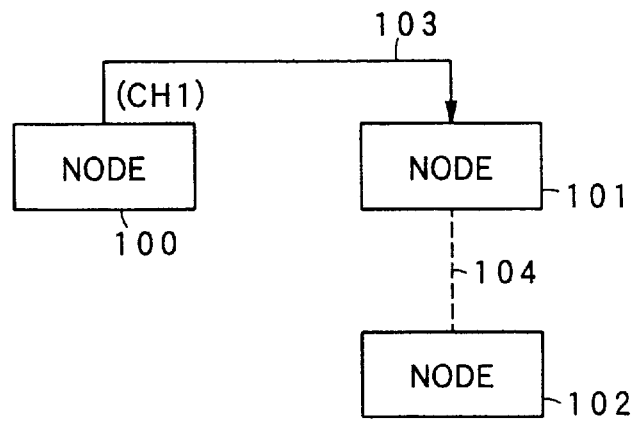
FIG. 14A is a diagram (I) indicating a problem in a prior art.
Figure 14B:
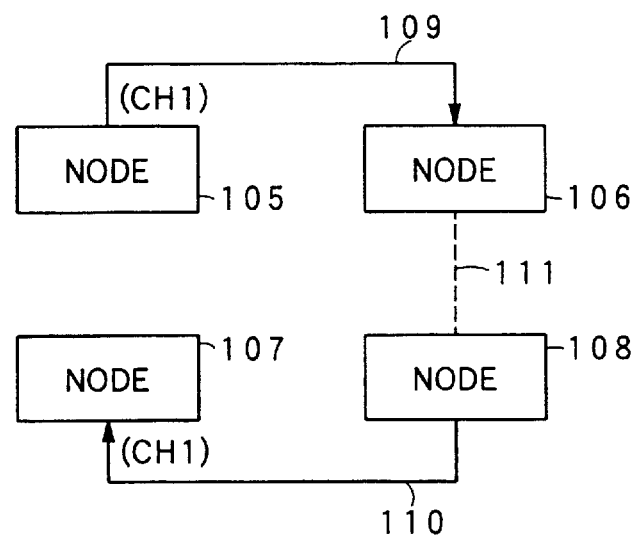
FIG. 14B is a diagram (II) indicating the problem in the prior art.

FIG. 7 is a block diagram showing a schematic configuration of a node in the embodiment. FIG. 8 is a block diagram showing a detailed configuration of a packet transmitting unit. FIG. 9 is a block diagram showing a detailed configuration of a packet receiving unit. FIG. 10 is a block diagram showing a detailed configuration of a packet receiving circuit. FIGS. 11A and 11B are flowcharts showing processes at a time of a data transmission after a bus reset. FIG. 12 is a flowchart showing processes in a transmission judging circuit at the time of the data transmission after the bus reset. FIG. 13 is a flowchart showing processes in the packet receiving unit at a time of a data reception after the bus reset.

In the present invention, an operation of transmitting/receiving a data between respective nodes is firstly started after the executions of the following various judgments after an occurrence of a bus reset, differently from the case in FIG. 6 (in which the operation of transmitting/receiving the data between the respective nodes is started immediately after the bus reset).

At first, a configuration of a node according to the present invention is described with reference to FIGS. 7 to 10.

In the configuration of the node described below, only a portion is described which has a relation with an information transmission according to the present invention, in the above-mentioned various electrical products. For example, a CD player CP serving as a node has a configuration as the CD player CP itself (a configuration to mainly reproduce information) in addition to a configuration described below.

At first, the whole configuration of the node according to the present invention is described with reference to FIG. 7.

As shown in FIG. 7, a node N in the embodiment is provided with a controller 1 serving as an initialization detecting device, a packet transmitting unit 2, a transmission judging circuit 3 serving as a transmission controlling device, an occupied period judging circuit 4 serving as an occupied period judging device, an occupied period measuring circuit 5 serving as an occupied period detecting device, a packet receiving unit 6 serving as an obtaining device, and a channel judging circuit 7 serving as a channel judging device.

Next, the operations will be described below.

As a premise, the controller 1 monitors a transmission occupation period occupied on the serial bus B by a later-described transmission data Str' transmitted by the node N, during a normal information transmission before an occurrence of the bus reset, and stores therein that value while sequentially updating it.

Then, if the packet receiving unit 6 is located within the node N as a receiving node, the packet receiving unit 6 receives a reception data Srv' from the serial bus B, in accordance with the conventional serial bus standard, and then transmits it to a reception data processor (not shown). Also, if the bus reset occurs, the packet receiving unit 6 executes a later-described receiving process according to the present invention in one second immediately after the occurrence, and reads in the data which is sent out from any other nodes and transmitted on the serial bus B in one second immediately after the occurrence of the bus reset, as a reception data Srv (hereafter, this data is referred to as a post-initialization reception data Srv), and then extracts a channel data Sch indicative of a channel used by the post-initialization reception data Srv (actually, one isochronous packet IP included in the data sent out immediately after the occurrence of the bus reset), and outputs it to the channel judging circuit 7.

In parallel with this, the packet receiving unit 6 extracts the cycle start packet CSP from the post-initialization reception data Srv, and generates a start packet signal Scsp for indicating a timing when the cycle start packet CSP is detected, and then outputs it to the occupied period measuring circuit 5 and the channel judging circuit 7. The packet receiving unit 6 also extracts a body of the data to be received from the post-initialization reception data Srv, and outputs it as an input data Srd to a processor of the node N which is not shown (for example, a record processor for recording an audio information inputted as the input data Srd, if the node N is a player MP).

Accordingly, when the occupied period measuring circuit 5 receives an allowance signal Sto of allowing the data to be transmitted from the controller 1 to the serial bus B, the occupied period measuring circuit 5 measures a transmission occupation period in the received post-initialization reception data Srv from the input timing of the start packet signal Scsp, in accordance with a system clock Sck (i.e., a system clock serving as a standard for an operation of each member included in the node N) inputted from external portion, and then generates a measurement data Sct including the measured result, and further outputs it to the occupied period judging circuit 4.

Next, when an occupied period data Sbw indicative of a transmission occupation period of a self-data before the bus reset which the controller 1 monitors and stores is transmitted from the controller 1, the occupied period judging circuit 4 judges in accordance with the occupied period data Sbw and the measurement data Sct whether or not it is possible to reserve the transmission occupation period to successively transmit the data before the bus reset to the serial bus B after the bus reset, and then generates an occupied period judgment signal Seb, and further outputs it to the transmission judging circuit 3.

On the other hand, in parallel with the above-mentioned operations, the channel judging circuit 7 compares the channel data Sch with a channel use data Schp indicative of the channel used for the data which is transmitted by it before the bus reset and outputted by the controller 1, at a timing when the start packet signal Scsp is inputted, and thereby judges whether or not the channel used for the data before the bus reset can be again used on the serial bus B after the bus reset, and then generates a channel judgment signal Sec, and outputs it to the transmission judging circuit 3.

Accordingly, the transmission judging circuit 3 determines that the data can be transmitted to the serial bus B as the node N in one second after the bus reset, only if the transmission occupation period can be reserved to successively transmit the data before the bus reset to the serial bus B after the bus reset and further the channel used for the data before the bus reset can be again used on the serial bus B after the bus reset, in accordance with the occupied period judgment signal Seb and the channel judgment signal Sec, and then outputs a transmission enable signal Ste to the packet transmitting unit 2.

Then, the packet transmitting unit 2 carries out the process of a later-described insertion of the process time information SYT with respect to an output data Sd (e.g., an output data Sd including an audio information reproduced by the MD player MP or the like if a node N is an MD player MP) which is composed of the other members of a node N and to be outputted from the node N, and then generates the above-mentioned isochronous packet IP. The packet transmitting unit 2 starts to transmit it as a post-initialization transmission data Str onto the serial bus B, only when receiving the transmission enable signal Ste from the transmission judging circuit 3.

Then, if the node N is the transmitting node at the time of the normal information transmission before the bus reset, the packet transmitting unit 2 carries out the process of inserting the process time information SYT with respect to the output data Sd, the process of generating the isochronous packet IP etc., in accordance with the conventional serial bus standard, and also carries out an operation of transmitting it as the above-mentioned transmission data Str' (i.e., the transmission data Str' corresponding to the reception data Srv' received by the packet receiving unit 6) onto the serial bus B.

In parallel with these operations, when the controller 1 receives a bus reset signal Sbr indicative of an occurrence of a bus reset from the serial bus B, the controller 1 controls the above-mentioned members so as to start the above-mentioned operations, and further outputs the occupied period data Sbw and the channel use data Schp sequentially stored before the bus reset.

Also, the controller 1 performs a predetermined adjustment on the IRM node, when the transmission enable signal Ste is outputted from the transmission judging circuit 3.

When a bus reset occurs since the serial bus B is newly connected to the node N containing the controller 1 or since the serial bus B connected to the node N until that time is opened, the controller 1 transmits the bus reset signal Sbr for reporting the occurrence of the bus reset to all the other nodes N included in a tree system containing the node N.

Next, the detailed configuration and the operations of the packet transmitting unit 2 within the node N will be described below with reference to FIG. 8.

As shown in FIG. 8, the packet transmitting unit 2 is provided with a cycle timer 2a, a time information generating unit 2b, a buffer 2c, a multiplexer 2d and an output unit 2e.

The operations will be described below.

At first, the cycle timer 2a generates a generation standard clock signal Ssck serving as a standard when the process time information SYT to be included in the isochronous packet IP is generated, in accordance with two standard clock signals Sckl (which has a period of 24.576 MHz) and Sck2 (which has a period of 8 kHz corresponding to a length (125 $\mu$sec) of an isochronous cycle IC) which are predetermined in the serial bus standard, and then outputs it to the time information generating unit 2b.

Then, in accordance with an interval signal Sit indicative of the SYT interval inputted from the external portion, the time information generating unit 2b generates the process time information SYT each time the pulses in the number of pulses indicated by the interval signal Sit are inputted, with regard to the pulse in the generation standard clock signal Ssck, and then outputs a corresponding time information signal Ssy to the multiplexer 2d.

On the other hand, the output data Sd to be outputted from the node N is transiently accumulated in the buffer 2c, and then outputted from the buffer 2c to the multiplexer 2d while having a consistency of a timing with the time information signal Ssy.

Then, the multiplexer 2d inserts the process time information SYT included in the time information signal Ssy into the output data Sd, and also inserts the information constituting the other IP header IPH and the CIP header CIPH, and then generates the post-initialization transmission data Str including the isochronous cycle IC, and further outputs it to the output unit 2e.

Accordingly, the output unit 2e outputs the post-initialization transmission data Str onto the serial bus B only when receiving the transmission enable signal Ste from the transmission judging circuit 3 (i.e., only when it is judged that the post-initialization transmission data Str can be transmitted in one second after the bus reset).

In addition, the packet transmitting unit 2 inserts the process time information SYT, the IP header IPH and the CIP header CIPH into the output data Sd at a time of the normal information transmission in which the bus reset does not occur, and then generates the transmission data Str' including the isochronous cycle IC, and further transmits it onto the serial bus B.

Next, the detailed configuration and the operations of the packet receiving unit 6 within the node N will be described below with reference to FIG. 9.

As shown in FIG. 9, the packet receiving unit 6 is provided with a controller 6a, a DBC calculating circuit 6b, a DBC judging circuit 6c serving as a continuity detecting device, a packet receiving circuit 6d and a packet selecting circuit 6e serving as a reception controlling device.

The operations will be described below.

At first, as a premise, the controller 6a monitors the value of the order information DBC (refer to FIG. 5) in the reception data Srv' received by the node N and the number of data blocks in the isochronous packet IP included in each isochronous transmission area ICT in the reception data Srv' (i.e., the value of the data block number DBS in the CIP header CIPH), during the normal information transmission before the occurrence of the bus reset, and stores the respective values separately while sequentially updating them.

Moreover, when the controller 1 receives the bus reset signal Sbr from the serial bus B, the controller 6a recognizes the occurrence of the bus reset through the controller 1, and then reports the occurrence to the packet receiving circuit 6d.

Then, when a bus reset occurs, the packet receiving circuit 6d reads the post-initialization reception data Srv inputted after the bus reset, and then extracts the order information DBC in the isochronous packet IP included in the read post-initialization reception data Srv from it, and further outputs it as an order information data Sdbc to the DBC judging circuit 6c, and also outputs the received post-initialization reception data Srv as it is to the packet selecting circuit 6e.

Moreover, the packet receiving circuit 6d extracts the cycle start packet CSP from the read post-initialization reception data Srv, and generates the start packet signal Scsp indicative of a timing of the extracted cycle start packet CSP, and then outputs it to the occupied period measuring circuit 5 and the channel judging circuit 7. The packet receiving circuit 6d also detects the channel used by each isochronous packet IP within the isochronous transmission area ICT included in the read post-initialization reception data Srv, and then generates the channel data Sch, and further outputs it to the channel judging circuit 7.

In parallel with this, the controller 6a outputs the value of the order information DBC immediately before the occurrence of the bus reset, among the number of the data blocks in the isochronous packet IP and the values of the order information DBC which the controller 6a stores while updating until that time, after the occurrence of the bus reset, as an order information data Sdbb to the DBC calculating circuit 6b, and also outputs the number of data blocks within the isochronous packet IP immediately before the occurrence of the bus reset, as a data block number data Sndb to the DBC calculating circuit 6b.

Then, the DBC calculating circuit 6b in accordance with the order information data Sdbb and the data block number data Sndb, generates an (expected) order information DBC identical to an order information DBC in an isochronous packet IP included in an isochronous transmission area ICT which is supposed to have been received in succession at the same timing as that immediately after the occurrence of the bus reset when assuming that the bus reset does not occur, by a later-described process, and then outputs an expected order data Sedb including the same order information DBC to the DBC judging circuit 6c.

Accordingly, the DBC judging circuit 6c compares the order information DBC indicated by the expected order data Sedb with the order information DBC within the isochronous packet IP included in the post-initialization reception data Srv included in the order information data Sdbc. Then, only if both of them coincides with each other, the DBC judging circuit 6c determines that it receives the reception data from the same node before and after the bus reset, and thereby generates a reception allowance signal Sebl, and further outputs it to the packet selecting circuit 6e.

Then, the packet selecting circuit 6e outputs the post-initialization reception data Srv inputted from the packet receiving circuit 6d to a processor (not shown) so as to demodulate the post-initialization reception data Srv only when receiving the reception allowance signal Sebl.

Next, the detailed configuration and the operations of the packet receiving circuit 6d will be described below with reference to FIG. 10.

As shown in FIG. 10, the packet receiving circuit 6d is provided with a cycle timer 10, a comparator 11, a PLL (Phase Locked Loop) circuit 12, a receiving buffer 13, a time information extracting unit 14, a reception selecting unit 15 and an extracting unit 16.

The operations will be described below.

At first, the cycle timer 10 generates a reception standard clock signal Sscr serving as a standard to carry out the receiving process in the packet receiving circuit 6d, in accordance with the two standard clock signals Sckl (which has the period of 24.576 MHz) and Sck2 (which has the period of 8 kHz corresponding to the length (125 μsec) of the isochronous cycle IC) which are predetermined in the serial bus standard, similarly to the cycle time 2a, and then outputs it to the comparator 11.

In parallel with this, the receiving buffer 13 transiently stores therein the read post-initialization reception data Srv, and then outputs it to the reception selecting unit 15 at a predetermined timing.

Then, the extracting unit 16 extracts the cycle start packet CSP and the order information DBC within the isochronous packet IP from the post-initialization reception data Srv, and also detects the channel used by each isochronous packet IP within the isochronous transmission area ICT, and then generates the order information data Sdbc, the start packet signal Scsp and the channel data Sch, and further outputs them to the DBC judging circuit 6c, the occupied period measuring circuit 5 and the channel judging circuit 7, respectively.

In parallel with this, the time information extracting unit 14 extracts the process time information SYT from the isochronous cycle IC included in the post-initialization reception data Srv, and then outputs it as the time information signal Ssy to the comparator 11.

Accordingly, the comparator 11 compares a value of the process time information SYT included in the time information signal Ssy with the reception standard clock signal Sscr, and then generates a comparison signal Scm which becomes at "HIGH if a time clocked by using the reception standard clock signal Sscr coincides with a time indicated by the process time information SYT, and then outputs it to the PLL circuit 12.

Then, the PLL circuit 12 generates a synchronization signal Sp11 synchronous with the comparison signal Scm, and outputs it to the reception selecting unit 15.

Accordingly, at a time indicated by the synchronization signal Sp11, the reception selecting unit 15 outputs the post-initialization reception data Srv having a corresponding process time information SYT as it is to the packet selecting circuit 6e.

The packet receiving circuit 6d always compares the value of the process time information SYT with the reception standard clock signal Sscr during the normal information transmission in which the bus reset does not occur, and outputs a reception data Srv' having a corresponding process time information SYT to a processor (not shown), when a time clocked by the reception standard clock signal Sscr coincides with a time indicated by the process time information SYT.

(III) Information Transmitting Operation According to Invention

An information transmitting process according to the embodiment in the node N having the above-mentioned configuration will be described below in further detail with reference to FIGS. 11A to 13.

FIGS. 11A, 11B and 12 are flowcharts showing the processes at a time of transmitting the post-initialization transmission data Str according to the embodiment (at a time of a transmission during a period within one second after the bus reset). FIG. 13 is a flowchart showing the processes at a time of receiving the post-initialization reception data Srv according to the embodiment (at a time of a reception in a period within one second after the bus reset).

At first, the operation of the channel judging circuit 7 at the time of transmitting the post-initialization transmission data Str is described with reference to FIG. 11A.

At the time of transmitting the post-initialization transmission data Str, the channel judging circuit 7 firstly inquires whether or not the controller 1 receives the bus reset signal Sbr from the serial bus B (Step S1). If the controller 1 does not receive (Step S1:N), the channel judging circuit 7 generates a channel judgment signal Sec indicating that a channel used by a transmission data Str' until that time can be used, in order to continue to carry out the normal information transmission, and then outputs it to the transmission judging circuit 3 (Step S5).

On the other hand, if the controller 1 receives the bus reset signal Sbr in the judgment at the step S1 (Step S1:Y), the channel judging circuit 7 judges whether or not a start packet signal Scsp is inputted from the packet receiving circuit 6 (Step S2). If it is not inputted (Step S2:N), the channel judging circuit 7 waits for the input. If it is inputted (Step S2:Y), the channel judging circuit 7 detects the channel used by the post-initialization reception data Srv, in accordance with the channel data Sch from the packet receiving circuit 6 (Step S3).

Next, the channel judging circuit 7 compares the detected channel with the channel used before the bus reset indicated by the channel use data Schp, and then judges whether or not the channel used before the bus reset is presently used (i.e., used immediately after the bus reset) (Step S4). If the channel used before the bus reset is already used (Step S4:N), the channel judging circuit 7 generates a channel judgment signal Sec indicating that the channel cannot be used after the bus reset, and then outputs it to the transmission judging circuit 3 (Step S6).

On the other hand, if the channel used before the bus reset is not presently used in the judgment at the step S4 (Step S4:Y), the channel judging circuit 7 generates a channel judgment signal Sec indicating that the channel can be used even after the bus reset, and then outputs it to the transmission judging circuit 3 (Step S5).

Here, this process may be designed as following. That is, if it is judged at the step S6 that the channel used before the bus reset cannot be used after the bus reset, the channel judging circuit 7 judges whether or not the start packet signal Scsp is again inputted from the packet receiving circuit 6 after that (Step S2). This is because there may be a possibility that a channel desired to be used becomes available during one isochronous cycle IC, and thereby the process at the step S2 is again carried out in order to judge this possibility.

The operations of the occupied period measuring circuit 5 and the occupied period judging circuit 4 at the time of transmitting the post-initialization transmission data Str will be collectively described below with reference to FIG. 11B.

At the time of transmitting the post-initialization transmission data Str, the occupied period measuring circuit 5 and the occupied period judging circuit 4 firstly inquire whether or not the controller 1 receives the bus reset signal Sbr from the serial bus B (Step S10), similarly to the step S1. If the controller 1 does not receive (Step S10:N), the occupied period judging circuit 4 generate an occupied period judgment signal Seb indicating that a transmission occupation period occupied by a transmission data Str' until that time can be used in succession, in order to continue to carry out the normal information transmission, and then outputs it to the transmission judging circuit 3 (Step S15).

On the other hand, if the controller 1 receives the bus reset signal Sbr in the judgment at the step S10 (Step S10:Y), it is judged whether or not the start packet signal Scsp is inputted from the packet receiving circuit 6 (Step S11), similarly to the step S2. If it is not inputted (Step S11:N), it waits for the input. If it is inputted (Step S11:Y), a transmission occupation period in the post-initialization reception data Srv is measured with an input timing of the start packet signal Scsp as a start timing, in accordance with an allowance signal Sto from the controller 1 (Step S12).

Actually as for the measurement of the transmission occupation period at the step S12, for example, the transmission occupation period is measured by respectively detecting the respective isochronous gaps IG (refer to FIG. 3) in the post-initialization reception data Srv, and then counting the number of pulses in the system clock Sck inputted between a time point when one isochronous gap IG is detected and a time point when a next isochronous gap IG is detected, and further adding the counted results with regard to all the isochronous packets IP within one isochronous transmission area ICT. At this time, a fact that the transmission of the isochronous packet IP is ended in one isochronous cycle IC is recognized by the detection of the above-mentioned sub-action gap SG.

If the transmission occupation period is determined (Step S12), the occupied period judging circuit 4 judges whether or not a result, in which a transmission occupation period to be occupied on the serial bus B when the post-initialization transmission data Str is transmitted (this is a transmission occupation period occupied before the bus reset and is inputted from the controller 1 as the occupied period data Sbw) is subtracted from 100 $\mu$sec as an upper limit value in the transmission occupation periods of all the isochronous packets IP in one isochronous cycle IC, is longer than the transmission occupation period recognized at the step S12 (Step S13). If it is not longer (Step S13:N), the occupied period judging circuit 4 generates an occupied period judgment signal Seb indicating that a transmission occupation period for the post-initialization transmission data Str to be transmitted after the bus reset cannot be reserved, and then outputs it to the transmission judging circuit 3 (Step S16).

Also similarly to the case of FIG. 11A, this process may be designed as following. That is, if it is judged at the step S16 that the transmission occupation period for the post-initialization transmission data Str to be transmitted after the bus reset cannot be reserved, the occupied period judging circuit 4 judges whether or not the start packet signal Scsp is again inputted from the packet receiving circuit 6 after that (Step S2). This is because there may be a possibility that a transmission occupation period desired to be used during one isochronous cycle IC becomes available, and thereby the process at the step S2 is again carried out in order to judge the possibility.

On the other hand, if it is judged in the judgment at the step S13 that the result in which the transmission occupation period to be occupied on the serial bus B when the post-initialization transmission data Str is transmitted is subtracted from 100 µsec is longer than the transmission occupation period recognized at the step S12 (Step S13:Y), the occupied period judging circuit 4 generates an occupied period judgment signal Seb indicating that the transmission occupation period for the post-initialization transmission data Str to be transmitted after the bus reset can be reserved, and then outputs it to the transmission judging circuit 3 (Step S15).

Next, the operations of the transmission judging circuit 3 at the time of transmitting the post-initialization transmission data Str will be described below with reference to FIG. 12.

When the channel judgment signal Sec is transmitted by the channel judging circuit 7 and further the occupied period judgment signal Seb is transmitted by the occupied period judging circuit 4, the transmission judging circuit 3 judges, in accordance with the occupied period judgment signal Seb and the channel judgment signal Sec, whether or not the transmission occupation period for the post-initialization transmission data Str to be transmitted after the bus reset can be reserved and further the channel used before the bus reset can be used even after the bus reset (Step S20). If both of them are possible (Step S20:Y), the transmission judging circuit 3 outputs a transmission enable signal Ste indicative of the transmission of the post-initialization transmission data Str to the packet transmitting unit 2 (Step S21).

After that, a predetermined adjustment process is performed on an IRM node (for example, an operation of rewriting the IRM node is performed) to then start the actual transmission of the post-initialization transmission data Str.

On the other hand, if the transmission occupation period for the post-initialization transmission data Str to be transmitted after the bus reset cannot be reserved, or if the channel used before the bus reset cannot be used after the bus reset (Step S20, N), the transmission judging circuit 3 outputs a transmission enable signal Ste indicative of a prohibition of the transmission of the post-initialization transmission data Str to the packet transmitting unit 2 (Step S22).

Accordingly, the post-initialization transmission data Str is transmitted onto the serial bus B, only if the transmission occupation period for the post-initialization transmission data Str to be transmitted in one second after the bus reset can be reserved and further the channel used before the bus reset can be used even after the bus reset.

In addition, an operation at the step S13 shown in FIG. 11B may be designed as follows. That is, if the result in which the transmission occupation period to be occupied on the serial bus B when the post-initialization transmission data Str is transmitted is subtracted from 100 µsec is longer than the transmission occupation period recognized at the step S12 (Step S13:Y), the operation of transmitting the post-initialization transmission data Str onto the serial bus B is instantly started, and a process of writing and recording the transmission occupation period and the use channel corresponding to the post-initialization transmission data Str is performed on the IRM node (not shown) at the same time.

Also, the operation at the step S13 may be designed as follows. That is, if the result in which the transmission occupation period recognized at the step S12 is subtracted from 100 µsec is longer than the transmission occupation period to be occupied on the serial bus B when the post-initialization transmission data Str is transmitted, the operation of transmitting the post-initialization transmission data Str onto the serial bus B is instantly started.

Next, the operations of the packet receiving unit 6 at a time of receiving the post-initialization reception data Srv will be described below with reference to FIG. 13.

The packet receiving unit 6, when receiving the post-initialization reception data Srv, firstly inquires of the controller 6a whether or not it receives the bus reset signal Sbr from the serial bus B (Step S25). If the controller 6a does not receive it (Step S25:N), the packet receiving unit 6 executes the process of receiving the reception data Srv' in order to continue the normal information transmission (Step S28).

On the other hand, if it is judged in the judgment at the step S25 that the controller 1 receives the bus reset signal Sbr (Step S25: Y), the DBC calculating circuit 6b adds the data block number in the isochronous packet IP immediately before the occurrence of the bus reset included in the data block number data Snbb onto the order information DBC immediately before the occurrence of the bus reset included in the order information data Sdbb, in accordance with the data block number data Sndb and the order information data Sdbb from the controller 6a. Then, the DBC calculating circuit 6b generates an order information DBC identical to an order information DBC in the isochronous packet IP (CIP header CIPH) included in the isochronous transmission area ICT, which is supposed to have been received in succession at the same timing as that immediately after the occurrence of the bus reset when assuming that the bus reset does not occur, and then outputs an expected order data Sedb including the same order information DBC to the DBC judging circuit 6c (Step S26).

Next, the DBC judging circuit 6c compares the order information DBC indicated by the expected order data Sedb with the order information DBC within the CIP header CIPH in the isochronous packet IP received after the bus reset included in the order information data Sdbc (Step S27). Then, if they are coincident to each other (Step S27:Y), the DBC judging circuit 6c determines that it receives the reception data from the same node before and after the bus reset, and thereby generates the reception allowance signal Sebl, and further continues to receive the post-initialization reception data Srv (Step S28).

On the other hand, if it is judged in the judgment at the step S27 that they are not coincident to each other (Step S27:N), the DBC judging circuit 6c determines that a node transmitting the post-initialization reception data Srv received after the bus reset is different from a node transmitting the reception data Srv' received immediately before the bus reset, and thereby does not generate the reception allowance signal Sebl, so that it does not receive the post-initialization reception data Srv (Step S29).

This process enables the post-initialization reception data Srv (the reception data Srv') to be received in succession only if the data transmitted by the same node before and after the bus reset is both received.

In addition, the operation of the judgment at the step S27 may be designed, in addition to the above-mentioned judging methods, as follows. For example, the value of the order information DBC immediately before the occurrence of the bus reset is compared with the value of the order information DBC within the order information data Sdbc obtained immediately after the occurrence of the bus reset. Then, if a difference between both of them is equal to or greater than a predetermined value, the operational flow instantly proceeds to the step S29. At this time, the predetermined value is actually established by considering an amount of data (data transmitted by each node) on the serial bus B, which may have a possibility of loss immediately after the occurrence because of the occurrence of the bus reset.

As mentioned above, according to the information transmitting process in the embodiment, it is judged whether or not the post-initialization transmission data Str can be transmitted in accordance with the post-initialization reception data Srv previously transmitted on the serial bus B after the bus reset. Then, the post-initialization transmission data Str is transmitted onto the serial bus B. Thus, when different post-initialization transmission data are transmitted from a plurality of nodes N onto the serial bus B after the bus reset, it is possible to carry out the transmission from at least one of the plurality of nodes N.

The post-initialization transmission data Str is transmitted only when the channel to be used by the post-initialization transmission data Str is not already used and further the transmission occupation period corresponding to the post-initialization transmission data Str can be reserved after the initialization. Thus, it is possible to prevent the mixture of the different post-initialization transmission data Str on one channel from disturbing the identification, and also possible to avoid the generation of the transmission occupation period which does not meet the serial bus standard.

Moreover, when the post-initialization transmission data Str is received, it is judged by detecting a presence or absence of a continuity of the order information DBC in the data before and after the bus reset, whether or not the post-initialization transmission data Str is received. Thus, even if the bus reset occurs, the reception data Srv' received until that time can be received in succession as the post-initialization reception data Srv.

Also, when the channel to be used for the post-initialization transmission data Str is not already used and further the transmission occupation period corresponding to the post-initialization transmission data Str can be reserved after the initialization, an IRM node indicating a channel presently used in the information transmitting system and a presently-occupied transmission occupation period manages the transmission occupation period and the use channel corresponding to the post-initialization transmission data Str. Thus, this enables the use channel used by the post-initialization transmission data Str and the transmission occupation period occupied by it to be quickly recognized by each node included in the information transmitting system.

In addition, the above-mentioned operation of the packet receiving unit 6 is designed so as to output the reception allowance signal Sebl from the DBC judging circuit 6c to only the packet selecting circuit 6e. However, other than this design, the following configuration may be designed. That is, the reception allowance signal Sebl is also outputted to the controller 6a. Only when the reception allowance signal Sebl is inputted to the controller 6a, the packet receiving circuit 6d is controlled by the controller 6a in such a way that the input of the post-initialization reception data Srv is allowed by the packet receiving circuit 6d.

This configuration can prevent the packet receiving unit 6 from receiving the post-initialization reception data Srv which is not desired to be received, at the stage of the packet receiving circuit 6d.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-294319 filed on Oct. 15, 1998 including the specification, claims, drawings and summary is incorporated herein by reference in its entirety.

What is claimed is:

1. An information transmitting apparatus, which is included in a system for transmitting information through a bus, for transmitting the information onto the bus, said information transmitting apparatus comprising:

an initialization detecting device for detecting whether or not the bus is initialized;

an obtaining device for obtaining post-initialization information, which is the information transmitted on the bus immediately after an initialization of the bus when the initialization of the bus is detected by said initialization detecting device; and a transmission controlling device for judging whether or not transmission information, which is the information to be transmitted onto the bus, can be transmitted in accordance with the obtained post-initialization information, and then transmitting the transmission information onto the bus if it is judged that the transmission information can be transmitted.

2. An information transmitting apparatus according to claim 1, further comprising:

a channel judging device for judging whether or not a use channel, which is a channel used by the transmission information, is already used by the post-initialization information on the bus in accordance with the obtained post-initialization information;

an occupied period detecting device for detecting a transmission occupied period, which is a period occupied while the post-initialization information is transmitted on the bus, in accordance with the obtained post-initialization information; and an occupied period judging device for judging whether or not an occupied period sum, which is a sum of the detected transmission occupation period and the transmission occupation period corresponding to the transmission information, is shorter than a predetermined allowable period based on a performance of the bus, said transmission controlling device transmitting the transmission information onto the bus, if the use channel is not used by the post-initialization information and further the occupation period sum is shorter than the predetermined allowable time, in accordance with a judgment result of said channel judging device and a judgment result of said occupied period judging device.

3. An information transmitting apparatus according to claim 2, wherein said transmission controlling device controls a managing device, which manages the channel presently used within the system and the transmission occupied period presently occupied, to manage the transmission occupied period and the use channel corresponding to the transmission information if the use channel is not used by the post-initialization information and further the occupation period sum is shorter than the predetermined allowable time, in accordance with the judgment result of said channel judging device and the judgment result of said occupied period judging device.

4. An information receiving apparatus, which is included in a system for transmitting information through a bus, for receiving the information transmitted by an information transmitting apparatus for transmitting the information onto the bus, said information transmitting apparatus comprising: (i) a first initialization detecting device for detecting whether or not the bus is initialized; (ii) an obtaining device for obtaining post-initialization information, which is the information transmitted on the bus immediately after an initialization of the bus when the initialization of the bus is detected by said first initialization detecting device; and (iii) a transmission controlling device for judging whether or not transmission information, which is the information to be transmitted onto the bus, can be transmitted in accordance with the obtained post-initialization information, and then transmitting the transmission information onto the bus if it is judged that the transmission information can be transmitted, said information receiving apparatus comprising:

a second initialization detecting device for detecting whether or not the bus is initialized;

a continuity detecting device for receiving the post-initialization information when the bus is initialized according to a detection result of said second initialization detecting device, and detecting a presence or absence of a continuity between the information received before the initialization and the post-initialization information; and a demodulating device for determining that the received post-initialization information is the transmission information only if there is the continuity according to a detection result of the continuity detecting device, and then demodulating the received post-initialization information.

5. An information receiving apparatus according to claim 4, wherein said continuity detecting device detects order information, which is included in an information unit in the post-initialization information and indicates an order of the information unit in the post-initialization information, and detects the continuity if there is a continuity between the order information in the information received before the initialization and the order information in the post-initialization information.

6. An information transmitting/receiving apparatus, which is included in a system for transmitting information through a bus, comprising an information transmitting apparatus for transmitting the information onto the bus, and an information receiving apparatus for receiving the information transmitted onto the bus by said information transmitting apparatus, (I) said information transmitting apparatus comprising:
an initialization detecting device for detecting whether or not the bus is initialized;
an obtaining device for obtaining post-initialization information, which is the information transmitted on the bus immediately after an initialization of the bus when the initialization of the bus is detected by said initialization detecting device; and a transmission controlling device for judging whether or not transmission information, which is the information to be transmitted onto the bus, can be transmitted in accordance with the obtained post-initialization information, and then transmitting the transmission information onto the bus if it is judged that the transmission information can be transmitted, (II) said information receiving apparatus comprising:
a continuity detecting device for receiving the post-initialization information when the bus is initialized according to a detection result of said second initialization detecting device, and detecting a presence or absence of a continuity between the information received before the initialization and the post-initialization information; and a demodulating device for determining that the received post-initialization information is the transmission information only if there is the continuity according to a detection result of the continuity detecting device, and then demodulating the received post-initialization information.

7. An information transmitting/receiving apparatus according to claim 6, wherein said information transmitting apparatus further comprises:
a channel judging device for judging whether or not a use channel, which is a channel used by the transmission information, is already used by the post-initialization information on the bus in accordance with the obtained post-initialization information;

an occupied period detecting device for detecting a transmission occupied period, which is a period occupied while the post-initialization information is transmitted on the bus, in accordance with the obtained post-initialization information; and an occupied period judging device for judging whether or not an occupied period sum, which is a sum of the detected transmission occupation period and the transmission occupation period corresponding to the transmission information, is shorter than a predetermined allowable period based on a performance of the bus, said transmission controlling device transmitting the transmission information onto the bus, if the use channel is not used by the post-initialization information and further the occupation period sum is shorter than the predetermined allowable time, in accordance with a judgment result of said channel judging device and a judgment result of said occupied period judging device.

8. An information transmitting method, in a system for transmitting information through a bus, of transmitting the information onto the bus, said information transmitting method comprising:

an initialization detecting process of detecting whether or not the bus is initialized;

an obtaining process of obtaining post-initialization information, which is the information transmitted on the bus immediately after an initialization of the bus when the initialization of the bus is detected by said initialization detecting process; and a transmission controlling process of judging whether or not transmission information, which is the information to be transmitted onto the bus, can be transmitted in accordance with the obtained post-initialization information, and then transmitting the transmission information onto the bus if it is judged that the transmission information can be transmitted.

9. An information transmitting method according to claim 8, further comprising:
- a channel judging process of judging whether or not a use channel, which is a channel used by the transmission information, is already used by the post-initialization information on the bus in accordance with the obtained post-initialization information;
- an occupied period detecting process of detecting a transmission occupied period, which is a period occupied while the post-initialization information is transmitted on the bus, in accordance with the obtained post-initialization information; and
- an occupied period judging process of judging whether or not an occupied period sum, which is a sum of the detected transmission occupation period and the transmission occupation period corresponding to the transmission information, is shorter than a predetermined allowable period based on a performance of the bus,
- said transmission controlling process transmitting the transmission information onto the bus, if the use channel is not used by the post-initialization information and further the occupation period sum is shorter than the predetermined allowable time, in accordance with a judgment result of said channel judging process and a judgment result of said occupied period judging process.

10. An information transmitting method according to claim 9, wherein said transmission controlling process controls a managing device, which manages the channel presently used within the system and the transmission occupied period presently occupied, to manage the transmission occupied period and the use channel corresponding to the transmission information if the use channel is not used by the post-initialization information and further the occupation period sum is shorter than the predetermined allowable time, in accordance with the judgment result of said channel judging process and the judgment result of said occupied period judging process.

11. An information receiving method, in a system for transmitting information through a bus, of receiving the information transmitted by an information transmitting method of transmitting the information onto the bus, said information transmitting method comprising: (i) a first initialization detecting process of detecting whether or not the bus is initialized; (ii) an obtaining process of obtaining post-initialization information, which is the information transmitted on the bus immediately after an initialization of the bus when the initialization of the bus is detected by said first initialization detecting process; and (iii) a transmission controlling process of judging whether or not transmission information, which is the information to be transmitted onto the bus, can be transmitted in accordance with the obtained post-initialization information, and then transmitting the transmission information onto the bus if it is judged that the transmission information can be transmitted, said information receiving method comprising:
- a second initialization detecting process of detecting whether or not the bus is initialized;
- a continuity detecting process of receiving the post-initialization information when the bus is initialized according to a detection result of said second initialization detecting process, and detecting a presence or absence of a continuity between the information received before the initialization and the post-initialization information; and
- a demodulating process of determining that the received post-initialization information is the transmission information only if there is the continuity according to a detection result of the continuity detecting process, and then demodulating the received post-initialization information.

12. An information receiving method according to claim 11, wherein said continuity detecting process detects order information, which is included in an information unit in the post-initialization information and indicates an order of the information unit in the post-initialization information, and detects the continuity if there is a continuity between the order information in the information received before the initialization and the order information in the post-initialization information.

13. An information transmitting/receiving method, in a system for transmitting information through a bus, comprising an information transmitting method of transmitting the information onto the bus, and an information receiving method of receiving the information transmitted onto the bus by said information transmitting method,
- (I) said information transmitting method comprising:
    - an initialization detecting process of detecting whether or not the bus is initialized;
    - an obtaining process of obtaining post-initialization information, which is the information transmitted on the bus immediately after an initialization of the bus when the initialization of the bus is detected by said initialization detecting process; and
    - a transmission controlling process of judging whether or not transmission information, which is the information to be transmitted onto the bus, can be transmitted in accordance with the obtained post-initialization information, and then transmitting the transmission information onto the bus if it is judged that the 20 transmission information can be transmitted,
- (II) said information receiving method comprising:
    - a continuity detecting process of receiving the post-initialization information when the bus is initialized according to a detection result of said second initialization detecting process, and detecting a presence or absence of a continuity between the information received before the initialization and the post-initialization information; and
    - a demodulating process of determining that the received post-initialization information is the transmission information only if there is the continuity according to a detection result of the continuity detecting process, and then demodulating the received post-initialization information.

14. An information transmitting/receiving method according to claim 13, wherein
said information transmitting method further comprises:
- a channel judging process of judging whether or not a use channel, which is a channel used by the transmission information, is already used by the post-initialization information on the bus in accordance with the obtained post-initialization information;
- an occupied period detecting process of detecting a transmission occupied period, which is a period occupied while the post-initialization information is transmitted on the bus, in accordance with the obtained post-initialization information; and
- an occupied period judging process of judging whether or not an occupied period sum, which is a sum of the detected transmission occupation period and the transmission occupation period corresponding to the transmission information, is shorter than a predetermined allowable period based on a performance of the bus, said transmission controlling process transmitting the transmission information onto the bus, if the use channel is not used by the post-initialization information and further the occupation period sum is shorter than the predetermined allowable time, in accordance with a judgment result of said channel judging process and a judgment result of said occupied period judging process.

* * * * *